United States Patent
Jang et al.

(10) Patent No.: US 9,793,552 B2
(45) Date of Patent: Oct. 17, 2017

(54) PTAU NANOPARTICLE CATALYST HEAT-TREATED IN THE PRESENCE OF CO AND METHOD FOR MANUFACTURING THE SAME

(71) Applicant: KOREA INSTITUTE OF SCIENCE AND TECHNOLOGY, Seoul (KR)

(72) Inventors: Jong Hyun Jang, Seoul (KR); Yung-Eun Sung, Seoul (KR); Hee-young Park, Seoul (KR); Hyoung-Juhn Kim, Gyeonggi-do (KR); Dirk Henkensmeier, Seoul (KR); Suk Woo Nam, Seoul (KR); Hyung Chul Ham, Seoul (KR); Tae-Hoon Lim, Seoul (KR); Sung Jong Yoo, Seoul (KR); Eun Ae Cho, Seoul (KR); Kug-Seung Lee, Gyeongsangbuk-do (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 405 days.

(21) Appl. No.: 14/193,083

(22) Filed: Feb. 28, 2014

(65) Prior Publication Data
US 2015/0196897 A1    Jul. 16, 2015

(30) Foreign Application Priority Data
Jan. 10, 2014    (KR) .................... 10-2014-0003341

(51) Int. Cl.
*B01J 23/58* (2006.01)
*H01M 4/92* (2006.01)

(52) U.S. Cl.
CPC ........... *H01M 4/926* (2013.01); *H01M 4/921* (2013.01)

(58) Field of Classification Search
CPC ........ H01M 4/926; H01M 4/921; Y02E 60/50
USPC ....................................................... 502/330
See application file for complete search history.

(56) References Cited

PUBLICATIONS

Hee-Young et al. "Enhancement of oxygen reduction reaction on PtAu nanoparticles via CO induced surface Pt enrichment", Applied Catalysis B: Environmental 129 (2013) 375- 381, Available online Oct. 2, 2012.*
Park et al. "Surface Structure of Pt-Modified Au Nanoparticles and Electrocatalytic Activity in Formic Acid Electro-Oxidation" J. Phys. Chem. C, 2007, 111 (51), pp. 19126-19133, Dec. 6, 2007.*
Bridgid N. Wanjala, et al; "Nanoscale Alloying, Phase-Segregation, and Core-Shell Evolution of Gold-Platinum Nanoparticles and Their Electrocatalytic Effect on Oxygen Reduction Reaction", Che. Mater. vol. 22, pp. 4282-4294, Published on Web Jun. 28, 2010.
Karl J. J. Mayrhofer, et al; "Adsorbate-Induced Segregation for Core-Shell Nanocatalysts", Angewandte Chemie Int. Ed. vol. 48, pp. 3529-3531; Article first published online Apr. 6, 2009.

* cited by examiner

*Primary Examiner* — Haytham Soliman
(74) *Attorney, Agent, or Firm* — Ladas & Parry LLP; Loren K. Thompson

(57) ABSTRACT

The present disclosure relates to a PtAu nanoparticle catalyst heat-treated in the presence of carbon monoxide (CO) and a method for preparing same. Since the $Pt_xAu_y$ nanoparticle catalyst heat-treated under CO atmosphere has high Pt surface area and superior oxygen reduction reaction (ORR) activity, a high-efficiency, high-quality fuel cell can be achieved by applying the catalyst to a fuel cell.

3 Claims, 12 Drawing Sheets

PTAU NANOPARTICLE CATALYST HEAT-TREATED IN THE PRESENCE OF CO AND METHOD FOR MANUFACTURING THE SAME

CROSS-REFERENCE TO RELATED APPLICATIONS

This application claims priority under 35 U.S.C. §119 to Korean Patent Application No. 10-2014-0003341 filed on Jan. 10, 2014, in the Korean Intellectual Property Office, the disclosure of which is incorporated herein by reference in its entirety.

TECHNICAL FIELD

The present disclosure relates to a PtAu nanoparticle catalyst heat-treated in the presence of CO and thus having superior oxygen reduction reaction (ORR) activity and a method for preparing same.

BACKGROUND

A fuel cell is a device that converts the chemical energy from a fuel such as hydrogen or methane into electricity. Recently, it draws attentions as a possible solution to ecofriendly vehicles. Also, with increased possibility of application as power source for houses, mobile devices, etc., researches are actively carried out.

Researches on fuel cells are focused on improvement of output density and output voltage by improving the characteristics of electrode, fuel and electrolyte membrane. In particular, many attempts are made to improve the activity of catalyst for improvement of electrode.

The electrode performance of a fuel cell is largely dependent on the chemical composition, size, distribution, stability, etc. of electrode catalyst nanoparticles that catalyzes oxidation and reduction reactions on the electrode. Also, it is greatly affected by the easiness of material transfer, such as diffusion of reactants to a catalyst layer, discharge of products, etc., which is related with the reactive surface area as well as the structure, distribution and connectivity of pores of the catalyst layer.

The slow rate of oxygen reduction reaction (ORR) is the major obstacle of the application of a polymer exchange membrane fuel cell (PEMFC) to vehicles, power generators, etc.

For utilization of the PEMFC in such applications as vehicles and power generators, the kinetic limitation of ORR has to be overcome since it is the fundamental cause of the following three problems.

Firstly, the overpotential necessary for the ORR reduces thermal efficiency under practical operation current densities much lower than its thermodynamic limit. Secondly, in order to satisfy the cost requirement for application to vehicles and power generators, the loading amount of platinum (Pt) on a PEMFC stack has to be decreased to about ⅕. Lastly, the loss and/or decomposition of Pt in a cathode has to be substantially decreased.

If a stable cathode catalyst having a specific activity somewhat increased over the up-to-date Pt/C catalyst could be developed, these limitations might be overcome. With the hope that improved catalytic activity and stability could be achieved from combinations of different metals, many binary alloys (or multicomponent) metal alloys are studied for ORR. Although these efforts resulted in gradual improvement of catalytic performance, much more improvement is still needed.

REFERENCES OF THE RELATED ART

Non-Patent Documents

*Angew. Chem. Int. Ed.* 48 (2009) 3529.
*Chem. Mat.* 22 (2010) 4282.

SUMMARY

The present disclosure is directed to providing a PtAu nanoparticle catalyst for a fuel cell, heat-treated in the presence of CO and having superior oxygen reduction reaction (ORR) activity.

The present disclosure is also directed to providing a method for preparing the PtAu nanoparticle catalyst heat-treated in the presence of CO.

In one general aspect, the present disclosure provides a PtAu nanoparticle catalyst prepared by heat-treating an untreated $Pt_xAu_y$ nanoparticle catalyst under carbon monoxide (CO) atmosphere, wherein x is an integer from 1 to 3 and y is 1.

The PtAu nanoparticle catalyst may be heat-treated under air atmosphere before the heat treating under carbon monoxide (CO) atmosphere.

The PtAu nanoparticle catalyst that has been heat-treated under CO atmosphere only may have a mass activity of 25-35 $A/g_{Pt}$ for oxygen reduction reaction (ORR), a surface Pt fraction of 70-80%, a specific activity of 1.5-2.0 $mA/cm_{Pt}^2$, an electrochemical surface area of Pt ($ECA_{Pt}$) of 35-45 $m^2/g_{Pt}$, a half-wave potential of 890-920 mV, and a potential of zero total charge (pztc) of 210-250 mV.

The heat treating may be performed at 400-500 K.

The PtAu nanoparticle catalyst that has been heat-treated under air atmosphere before the heat treating under CO atmosphere may have a mass activity of 200-500 $mA/mg_{Pt}$, a specific activity of 0.6-1.0 $mA/cm_{Pt}^2$, an electrochemical surface area of Pt ($ECA_{Pt}$) of 28-32 $m^2/g_{Pt}$, and a half-wave potential of 930-960 mV. Further, the oxygen reduction reaction (ORR) activity may be decreased by 4-7% after a potential cycling.

In another general aspect, the present disclosure provides a method for preparing a PtAu nanoparticle catalyst, including: preparing a $Pt_xAu_y$ nanoparticle catalyst by mixing a Pt salt, an Au salt and a stabilizer; and heat-treating the $Pt_xAu_y$ nanoparticle catalyst under carbon monoxide (CO) atmosphere.

The method may further include heat-treating the $Pt_xAu_y$ nanoparticle catalyst under air atmosphere before the heat treating under carbon monoxide (CO) atmosphere.

The stabilizer may be one or more selected from a group consisting of disodium phosphate, sodium dodecyl sulfate, sodium citrate and oleylamine.

The heat treating may be performed at 400-500 K.

The flow rate of the carbon monoxide (CO) may be 300-600 $cm^3/min$.

The PtAu nanoparticle catalyst of the present disclosure has improved oxygen reduction reaction (ORR) activity and, when used in a fuel cell, can provide a fuel cell having high efficiency and superior durability. Specifically, the PtAu nanoparticle catalyst has improved surface Pt fraction, specific activity, pztc, mass activity, electrochemical surface area of Pt ($ECA_{Pt}$) and half-wave potential as compared to an untreated nanoparticle catalyst. Since the increase in surface Pt fraction, specific activity and pztc are data reflecting decreased OH adsorption energy, it can be seen that ORR activity is enhanced as a result of decreased OH adsorption energy. Further, the increase in mass activity, $ECA_{Pt}$ and half-wave potential contributes to the enhancement of ORR activity.

Accordingly, superior ORR activity can be achieved.

BRIEF DESCRIPTION OF THE DRAWINGS

The above and other objects, features and advantages of the present disclosure will become apparent from the following description of certain exemplary embodiments given in conjunction with the accompanying drawings, in which.

DETAILED DESCRIPTION OF EMBODIMENTS

Figure 1:
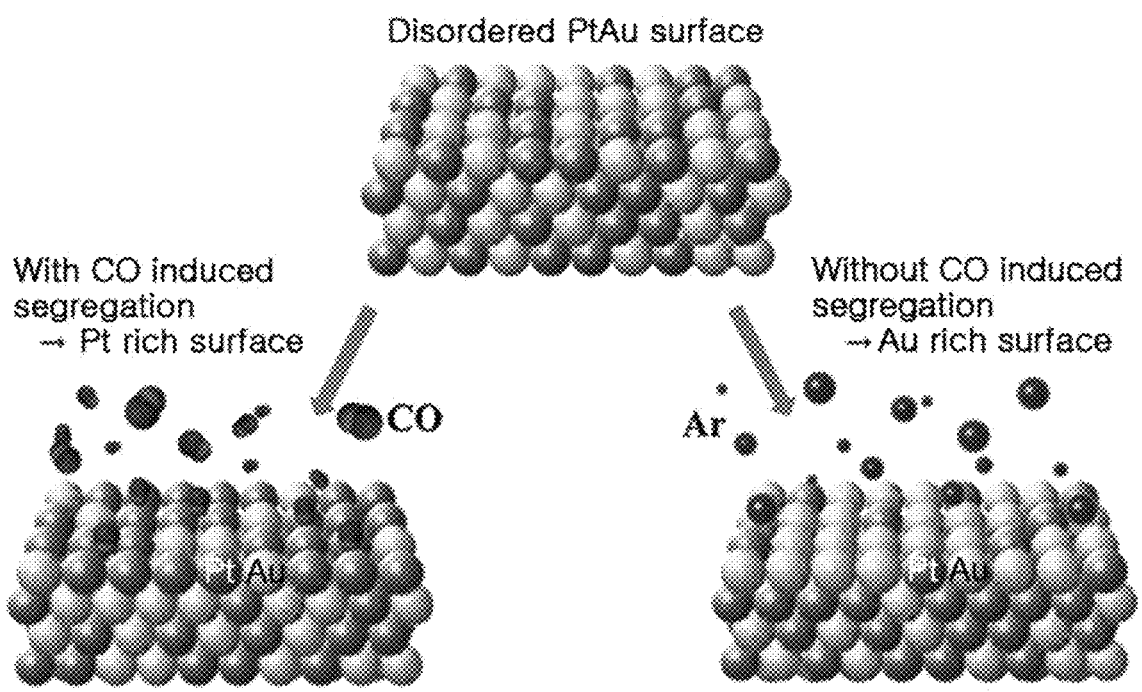
FIG. 1 schematically shows the surface of a PtAu—CO nanoparticle catalyst and a PtAu—Ar nanoparticle catalyst prepared in an example and a comparative example.

The present disclosure relates to a PtAu nanoparticle catalyst having improved oxygen reduction reaction (ORR) activity and a method for preparing same.

Hereinafter, the present disclosure will be described in detail with reference to the accompanying drawings.

Formerly, a Pt catalyst was used as a nanoparticle catalyst for a fuel cell. However, because of high cost, the Pt catalyst has been replaced by a PtTM alloy nanoparticle catalyst using a transition metal (TM) for commercialization of the fuel cell. Although the PtTM nanoparticle catalyst has improved oxygen reduction reaction (ORR) activity, it is problematic in that the transition metal is dissolved out during the operation of the fuel cell because of decreased activity.

In the present disclosure, a PtAu alloy nanoparticle catalyst using Au having superior inherent stability (hereinafter, referred to as a $Pt_xAu_y$ nanoparticle catalyst) is used for application to a fuel cell for oxygen reduction reaction (ORR), formic acid oxidation, methanol oxidation, or the like. Although an Au—Pt nanoparticle catalyst of a core-shell structure or a Pt monolayer is preferred for strong electronic modification of Pt in general, the PtAu alloy nanoparticle catalyst is used because they are not inadequate for large-scale production. In particular, the Au—Pt nanoparticle catalyst having a core-shell structure is problematic in long-term stability since stability is not ensured in acidic solutions and at ORR potentials.

The $Pt_xAu_y$ nanoparticle catalyst exhibits less OH adsorption and improved ORR activity over the existing Pt nanoparticle catalyst because of shrinkage deformation due to lattice mismatch between Pt and Au. However, the ORR activity of the $Pt_xAu_y$ nanoparticle catalyst is lower than that of the PtTM nanoparticle catalyst and further treatment is required to improve the ORR activity. The $Pt_xAu_y$ nanoparticle catalyst, wherein x is an integer from 1 to 3 and y is 1, is supported on carbon.

To provide a fuel cell of high efficiency and superior quality, a nanoparticle catalyst having high ORR activity is necessary. There are two methods of enhancing the ORR activity.

One is to reduce OH adsorption energy by modifying the electronic structure of the $Pt_xAu_y$ nanoparticle catalyst and the other is to increase Pt surface area by controlling the surface composition of the $Pt_xAu_y$ nanoparticle catalyst, thereby increasing the number of active sites for ORR. The OH adsorption energy is reduced as the proportion of Pt in the surface layer of the catalyst increases as compared to Au. The decrease in the OH adsorption energy leads to improved specific activity, thereby enhancing the ORR activity.

If an untreated $Pt_xAu_y$ nanoparticle catalyst (e.g., $Pt_xAu_y$-AP) is heat-treated under carbon monoxide (CO) atmosphere, such that Pt—Au segregation occurs on the surface of the $Pt_xAu_y$ nanoparticle catalyst, both the electronic structure and the surface composition are modified at the same time and, accordingly, the ORR activity of the $Pt_xAu_y$ nanoparticle catalyst can be enhanced. To enhance the ORR activity by improving surface Pt fraction, specific activity, pztc, mass activity, electrochemical surface area of Pt ($ECA_{Pt}$) and half-wave potential, the CO flow rate and the heat-treating temperature should be controlled to 300-600 cm³/min and 400-500 K, respectively. The $Pt_xAu_y$ nanoparticle catalyst may also be heat-treated under air atmosphere before the heat treating under carbon monoxide (CO) atmosphere.

The physical properties of the $Pt_xAu_y/C$ nanoparticle catalyst heat-treated under carbon monoxide (CO) atmosphere (e.g., a $Pt_xAu_y$—CO nanoparticle catalyst, not heat-treated under air atmosphere) are as follows.

The $Pt_xAu_y$—CO nanoparticle catalyst has a mass activity of 25-35 $A/g_{Pt}$, specifically 32-34 $A/g_{Pt}$, which is considerably improved as compared to the untreated $Pt_xAu_y$ nanoparticle catalyst (15-19 $A/g_{Pt}$).

And, the $Pt_xAu_y$—CO nanoparticle catalyst has a surface Pt fraction of 70-80%, specifically 70-75%, which is considerably improved as compared to the untreated $Pt_xAu_y$ nanoparticle catalyst (63-67%).

And, the $Pt_xAu_y$—CO nanoparticle catalyst has a specific activity of 1.5-2.0 $mA/cm_{Pt}^2$, specifically 1.6-1.8 $mA/cm_{Pt}^2$, which is considerably improved as compared to the untreated $Pt_xAu_y$ nanoparticle catalyst (1.0-1.2 $mA/cm_{Pt}^2$).

And, the $Pt_xAu_y$—CO nanoparticle catalyst has an electrochemical surface area of Pt ($ECA_{Pt}$) of 35-45 $m^2/g_{Pt}$, specifically 35-40 $m^2/g_{Pt}$, which is considerably improved as compared to the untreated $Pt_xAu_y$ nanoparticle catalyst (30.0-33.0 $m^2/g_{Pt}$), meaning that the $Pt_xAu_y$—CO nanoparticle catalyst has increased Pt surface area. Meanwhile, the electrochemical surface area of Au ($ECA_{Au}$) is 11-16 $m^2/g_{Pt}$, which is decreased as compared to the untreated $Pt_xAu_y$ nanoparticle catalyst (17-19 $m^2/g_{Pt}$).

And, the $Pt_xAu_y$—CO nanoparticle catalyst has a half-wave potential ($E_{1/2}$) of 890-920 mV, specifically 900-910 mV, which is considerably improved as compared to the untreated $Pt_xAu_y$ nanoparticle catalyst (850-887 mV).

And, the $Pt_xAu_y$—CO nanoparticle catalyst has a potential of zero total charge (pztc) of 210-250 mV, specifically 215-230 mV, which is considerably improved as compared to the untreated $Pt_xAu_y$ nanoparticle catalyst (190-209 mV).

The increased surface Pt fraction, specific activity and pztc mean decreased OH adsorption energy as compared to the untreated $Pt_xAu_y$ nanoparticle catalyst, which leads to enhanced ORR activity. And, the increased mass activity, electrochemical surface area of Pt ($ECA_{Pt}$) and half-wave potential demonstrate the enhanced ORR activity as compared to the untreated $Pt_xAu_y$ nanoparticle catalyst.

The $Pt_xAu_y$—CO nanoparticle catalyst of the present disclosure has an average nanoparticle size of 1.7-2.3 nm, specifically 2.1-2.2 nm, which is larger as compared to the untreated $Pt_xAu_y$ nanoparticle catalyst (1.50-1.86 nm). The larger average nanoparticle size leads to increased pztc, thereby enhancing the ORR activity.

Since the untreated $Pt_xAu_y$ nanoparticle catalyst and a $Pt_xAu_y$—Ar nanoparticle catalyst prepared by heat-treating the $Pt_xAu_y$ nanoparticle catalyst in the presence of argon (Ar) have lower surface Pt fraction, pztc, electrochemical surface area of Pt ($ECA_{Pt}$) as compared to the $Pt_xAu_y$—CO nanoparticle catalyst, they have lower specific activity, mass activity and half-wave potential and thus exhibit lower ORR activity as compared to the $Pt_xAu_y$—CO nanoparticle catalyst.

The physical properties of the $Pt_xAu_y$ nanoparticle catalyst heat-treated under air atmosphere and then heat-treated under carbon monoxide (CO) atmosphere (e.g., a $Pt_xAu_y$-A-CO nanoparticle catalyst) are as follows.

The $Pt_xAu_y$-A-CO nanoparticle catalyst has a mass activity of 200-500 $mA/mg_{Pt}$, specifically 250-350 $mA/mg_{Pt}$, which is considerably improved as compared to the $Pt_xAu_y$ nanoparticle catalyst not heat-treated under carbon monoxide (CO) atmosphere (e.g., a $Pt_xAu_y$-A nanoparticle catalyst) (100-180 $mA/mg_{Pt}$).

And, the $Pt_xAu_y$-A-CO nanoparticle catalyst has a specific activity of 0.6-1.0 $mA/cm_{Pt}^2$, specifically 0.7-0.8 $mA/cm_{Pt}^2$, which is considerably improved as compared to the $Pt_xAu_y$-A nanoparticle catalyst (0.2-0.45 $mA/cm_{Pt}^2$).

And, the $Pt_xAu_y$-A-CO nanoparticle catalyst has an electrochemical surface area of Pt ($ECA_{Pt}$) of 28-32 $m^2/g_{Pt}$, specifically 30-32 $m^2/g_{Pt}$, which is comparable to the $Pt_xAu_y$-A nanoparticle catalyst (31-33 $m^2/g_{Pt}$).

And, the $Pt_xAu_y$-A-CO nanoparticle catalyst has a half-wave potential ($E_{1/2}$) of 930-960 mV, specifically 930-950 mV, which is slightly improved as compared to the $Pt_xAu_y$-A nanoparticle catalyst (900-925 mV).

The increased surface specific activity means decreased OH adsorption energy as compared to the $Pt_xAu_y$-A nanoparticle catalyst, which leads to enhanced ORR activity. And, the increased mass activity and half-wave potential demonstrate the enhanced ORR activity as compared to the $Pt_xAu_y$-A nanoparticle catalyst.

The superior ORR activity of the $Pt_xAu_y$-A-CO nanoparticle catalyst is decreased by 4-7% after potential cycling as compared to that before potential cycling, which is comparable to that of the $Pt_xAu_y$-A nanoparticle catalyst but smaller than that of the untreated $Pt_xAu_y$ nanoparticle catalyst (decrease by 44-48%). Accordingly, the $Pt_xAu_y$-A-CO nanoparticle catalyst is considerably stable as compared to the untreated $Pt_xAu_y$ nanoparticle catalyst.

Since the untreated $Pt_xAu_y$ nanoparticle catalyst and a $Pt_xAu_y$-A-CO—Ar nanoparticle catalyst prepared by heat-treating the $Pt_xAu_y$ nanoparticle catalyst under air, carbon monoxide and argon (Ar) atmosphere in sequence have smaller electrochemical surface area of Pt ($ECA_{Pt}$) than the $Pt_xAu_y$-A-CO nanoparticle catalyst, mass activity and half-wave potential are lower and thus they exhibit lower ORR activity as compared to the $Pt_xAu_y$-A-CO nanoparticle catalyst. Specifically, the $Pt_xAu_y$-A-CO nanoparticle catalyst exhibits an ORR activity of 210-230 $mA/mg_{metal}$, whereas the untreated $Pt_xAu_y$ nanoparticle catalyst exhibits an ORR activity corresponding to ⅓-¼ of that of the $Pt_xAu_y$-A-CO nanoparticle catalyst.

The present disclosure also provides a method for preparing a PtAu nanoparticle catalyst.

The method for preparing a PtAu nanoparticle catalyst of the present disclosure may include: preparing a $Pt_xAu_y$ nanoparticle catalyst by mixing a Pt salt, an Au salt and a stabilizer; and heat-treating the $Pt_xAu_y$ nanoparticle catalyst at 400-500 K under carbon monoxide (CO) atmosphere. Also, the method may further include heat-treating the $Pt_xAu_y$ nanoparticle catalyst at 400-500 K for 30-100 minutes under air atmosphere before the heat treating under carbon monoxide (CO) atmosphere.

The flow rate of the carbon monoxide (CO) may be 300-600 $cm^3$/min.

As a specific embodiment, the method for preparing a PtAu nanoparticle catalyst includes: preparing a precursor mixture by mixing a Pt salt, an Au salt and a stabilizer; forming a colloidal solution by adding an aqueous solution of sodium citrate and sodium borohydride while stirring the precursor mixture; adding carbon black to the colloidal solution and stirring same; adding perchloric acid to the stirred colloidal solution and then stirring and filtering same; and drying the filtrate at room temperature and then heat-treating for 30-100 minutes under carbon monoxide (CO) atmosphere.

First, a precursor mixture is prepared by dissolving a Pt salt, an Au salt and a stabilizer in deionized (DI) water. The Pt salt, the Au salt and the stabilizer are mixed at a molar ratio of 1-3:1:0.3-0.8. If the proportion of the stabilizer is lower, the nanoparticle size may increase excessively and the particle size distribution may not be uniform. And, if the proportion of the stabilizer is higher, it may contaminate the surface of the nanoparticle, thereby reducing the activity of the catalyst.

The stabilizer may be one or more selected from a group consisting of disodium phosphate, sodium dodecyl sulfate, sodium citrate and oleylamine, specifically sodium citrate.

The deionized (DI) water may be purified using a Mili-Q system (18.2 MΩ cm; Millipore, Bedford, Mass., USA).

Next, a colloidal solution is formed by quickly adding an aqueous solution of an alkali metal-based material and a hydride-based material to the precursor mixture while vigorously stirring the precursor mixture and then stirring same for 20-40 minutes. The transparent colloidal solution turns from yellow to dark brown.

The alkali metal-based material may be one or more selected from a group consisting of sodium citrate, disodium phosphate, dipotassium phosphate and sodium dodecyl sulfate, specifically sodium citrate.

The hydride-based material may be one or more selected from a group consisting of sodium borohydride, lithium borohydride, sodium aluminum hydride and lithium aluminum hydride, specifically sodium borohydride.

The alkali metal-based material is mixed at a molar ratio of 1:0.15-0.5 based on the Pt salt, and the hydride-based material is mixed at a molar ratio of 1:15-25 based on the Pt salt. If the molar ratio of the alkali metal-based material is below the lower limit, the nanoparticle size may increase excessively and the particle size distribution may not be uniform. And, if the molar ratio is above the upper limit, the activity of the catalyst may decrease because of the contamination of the surface of the catalyst particles. If the molar ratio of the hydride-based material is below the lower limit, the metal salts may not be sufficiently reduced. And, if the ratio is above the upper limit, the nanoparticle size may not be uniform and the cost of catalyst preparation may increase because of increased use of the expensive hydride salt.

Next, a $Pt_xAu_y$ nanoparticle catalyst supported on a carbon support is prepared by adding carbon black to the colloidal solution and stirring same for 10-15 hours.

Next, a $Pt_xAu_y$ nanoparticle catalyst is prepared by adding perchloric acid to the stirred colloidal solution and then drying same at room temperature (23-26° C.) after stirring and filtering. The $Pt_xAu_y$ nanoparticle catalyst before treatment with gas and heat is referred to as a $Pt_xAu_y$-AP nanoparticle catalyst.

Next, a $Pt_xAu_y$—CO nanoparticle catalyst is prepared by heat-treating the prepared $Pt_xAu_y$-AP nanoparticle catalyst at 400-500 K for 30-100 minutes under carbon monoxide (CO, 99.9%) atmosphere.

If the heat-treating temperature is below the lower limit, surface segregation of the $Pt_xAu_y$-AP nanoparticle catalyst by the CO may not occur. And, if the heat-treating temperature is above the upper limit, the ORR activity of the catalyst may decrease because of decreased specific surface area.

The carbon monoxide (CO) is supplied at a flow rate of 300-600 cm³/min. If the flow rate of the carbon monoxide (CO) is below the lower limit, surface segregation of the $Pt_xAu_y$-AP nanoparticle catalyst by the CO may not occur.

As another exemplary embodiment, a method for preparing a PtAu nanoparticle catalyst includes: adding carbon black to an anhydrous alcohol and then dispersing a Pt salt, an Au salt and a stabilizer; preparing a $Pt_xAu_y$ nanoparticle catalyst solution by adding a reducing agent while stirring the dispersion mixture; filtering the $Pt_xAu_y$ nanoparticle catalyst solution, drying the filtrate and then heat-treating same for 30-100 minutes under air atmosphere; and heat-treating the catalyst that has been heat-treated under air atmosphere for 30-100 minutes under carbon monoxide (CO) atmosphere.

First, carbon black is added to an anhydrous alcohol such as anhydrous ethanol, anhydrous methanol, etc. and, after stirring, a Pt salt, an Au salt and a stabilizer are dispersed therein.

Next, a $Pt_xAu_y$-AP nanoparticle catalyst supported on carbon is prepared by adding a reducing agent to the dispersion mixture. The $Pt_xAu_y$-AP nanoparticle catalyst supported on carbon has a metal content of 30-50 wt %.

The reducing agent may be one or more selected from a group consisting of tert-butylamine borane, triethylamine borane, formic acid, ammonium formate and dimethylamine borane.

Next, a $Pt_xAu_y$-A nanoparticle catalyst is prepared by filtering the prepared $Pt_xAu_y$-AP nanoparticle catalyst solution, drying the filtrate in a vacuum oven for 10-24 hours and then heat-treating same at 400-500 K for 30-100 minutes in a tube furnace under air atmosphere.

Next, a $Pt_xAu_y$-A-CO nanoparticle catalyst is prepared by heat-treating the prepared $Pt_xAu_y$-A nanoparticle catalyst at 400-500 K for 5-10 hours under carbon monoxide (CO, 99.9%) atmosphere.

If the heat-treating temperature is below the lower limit, surface segregation of the $Pt_xAu_y$-A nanoparticle catalyst by the CO may not occur. And, if the heat-treating temperature is above the upper limit, the ORR activity of the catalyst may decrease because of decreased specific surface area.

The carbon monoxide (CO) is supplied at a flow rate of 300-600 cm³/min. If the flow rate of the carbon monoxide (CO) is below the lower limit, surface segregation of the $Pt_xAu_y$-A nanoparticle catalyst by the CO may not occur.

Hereinafter, the present disclosure will be described in more detail through specific examples. However, the following examples are for illustrative purposes only and not intended to limit the scope of this disclosure. It will be obvious to those skilled in the art that various changes and modifications can be made to the examples within the scope and technical idea of the present disclosure and that such changes and modifications are also included in the scope of the appended claims.

Example 1

Preparation of PtAu—CO Nanoparticle Catalyst $H_2PtCl_6 \cdot 6H_2O$ (0.128 mmol), $HAuCl_4 \cdot 3H_2O$ (0.128 mmol) and sodium citrate (0.068 mmol) were dissolved in DI water (800 mL) and an aqueous solution of sodium citrate (0.034 mmol) and sodium borohydride (2.64 mmol) was quickly added to the precursor solution under vigorous stirring. After stirring for 30 minutes, carbon black (Vulcan-XC72, 0.075 g, Cabot) was added and the mixture was stirred for 12 hours. Then, after adding 0.2 M $HClO_4$ (200 mL) and stirring for 1 hour, the mixture was filtered, washed and dried at room temperature to prepare a PtAu-AP nanoparticle catalyst.

Subsequently, the PtAu-AP nanoparticle catalyst was heat-treated in a tube furnace at 423 K for 1 hour under CO (99.9%, flow rate: 500 cm³/min) atmosphere to prepare a PtAu—CO nanoparticle catalyst.

In the PtAu—CO nanoparticle catalyst, the ratio of Pt and Au is 1:1.

Example 2. Preparation of $Pt_3Au$-A-CO Nanoparticle Catalyst

Carbon black (Vulcan-XC72, 0.075 g, Cabot) was added to anhydrous ethanol (800 mL) and $H_2PtCl_6.6H_2O$ (0.384 mmol), $HAuCl_4.3H_2O$ (0.128 mmol) and oleylamine (0.068 mmol) were dispersed by adding thereto. After adding Pert-butylamine borane (0.05 mmol), the mixture was stirred for 1 hour. Then, the mixture was filtered, washed, dried in an oven for 12 hours ($Pt_3Au$) and then heat-treated in a tube furnace at 473 K for 1.5 hours under air atmosphere to prepare a $Pt_3Au$-A nanoparticle catalyst.

For surface segregation of Pt of the prepared $Pt_3Au$-A nanoparticle catalyst, the $Pt_3Au$-A nanoparticle catalyst was heat-treated in a tube furnace at 473 K for 10 hours under CO (99.9%, flow rate: 500 cm³/min) atmosphere to prepare a $Pt_3Au$-A-CO nanoparticle catalyst.

Comparative Example 1

Preparation of PtAu-AP Nanoparticle Catalyst

A PtAu-AP nanoparticle catalyst was prepared in the same manner as in Example 1, except that the heat treating under CO atmosphere was omitted.

Comparative Example 2

Preparation of PtAu—Ar Nanoparticle Catalyst

A PtAu—Ar nanoparticle catalyst was prepared in the same manner as in Example 1, except that the heat treating was performed at 423 K for 2 hours under Ar (99.999%) atmosphere.

Comparative Example 3

Preparation of $Pt_3Au$-A Nanoparticle Catalyst

A $Pt_3Au$-A nanoparticle catalyst was prepared in the same manner as in Example 2, except that the heat treating under CO atmosphere was omitted.

Comparative Example 4

Preparation of $Pt_3Au$-A-CO—Ar Nanoparticle Catalyst

A $Pt_3Au$-A-CO—Ar nanoparticle catalyst was prepared in the same manner as in Example 2, except that heat treating was performed at 473 K for 2 hours under Ar (99.999%) atmosphere after the heat treating under CO atmosphere.

Test Examples

Example 1

Comparison with PtAu Nanoparticle Catalysts Prepared in Comparative Example 1 and Comparative Example 2

Test Example 1

Surface Structure of PtAu—CO and PtAu—Ar Nanoparticle Catalysts

FIG. 1 schematically shows the surface of the PtAu—CO nanoparticle catalyst and the PtAu—Ar nanoparticle catalyst prepared in Example 1 and Comparative Example 2.

Since Pt (2.34 J/m²) has higher surface energy than Au (1.41 J/m²), a lower concentration of Pt on the catalyst surface (decreased Pt surface area) is thermodynamically more stable. This spontaneous procedure was accelerated by the heat treating under Ar atmosphere, thereby decreasing ORR activity (right-side catalyst).

In contrast, in the present disclosure, the heating under CO atmosphere increased the concentration of Pt on the catalyst surface toward a thermodynamically unstable direction, thereby enhancing ORR activity (left-side catalyst).

Test Example 2

Characteristics of PtAu—CO, PtAu-AP and PtAu—Ar Nanoparticle Catalysts

For comparison, a Pt catalyst was commercially purchased and an Au catalyst was prepared from an Au salt and sodium borohydride in the presence of sodium citrate.

Figure 2:
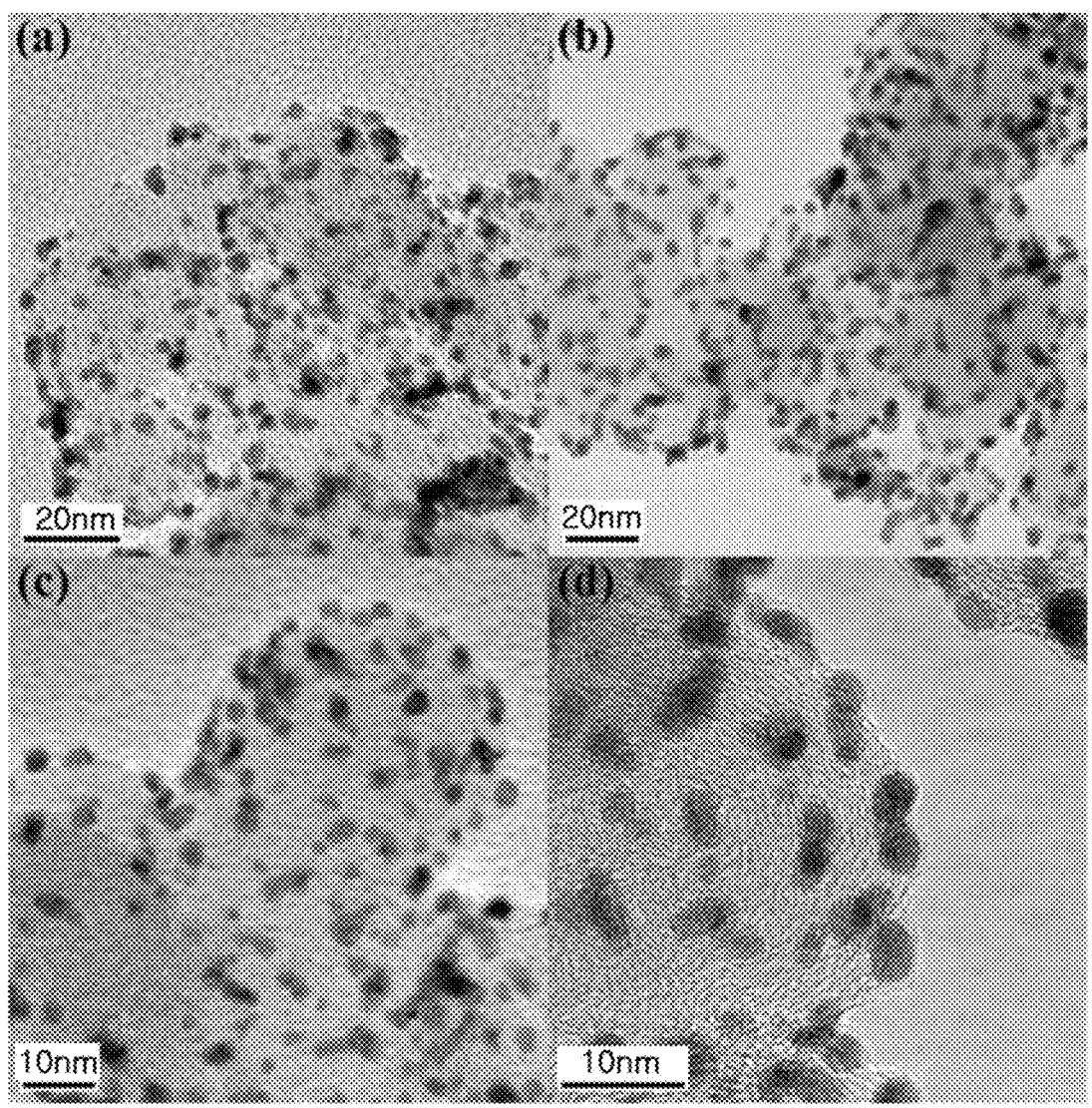
FIG. 2 shows TEM images of a PtAu-AP nanoparticle catalyst (a), a PtAu—Ar nanoparticle catalyst (b) and a PtAu—CO nanoparticle catalyst (c) and an enlarged TEM image of the PtAu—CO nanoparticle catalyst (d)

FIG. 2 shows the TEM images of the nanoparticle catalysts prepared in Example 1, Comparative Example 1 and Comparative Example 2.

The PtAu—CO nanoparticle catalyst (Example 1, c), the PtAu-AP nanoparticle catalyst (Comparative Example 1, a) and the PtAu—Ar nanoparticle catalyst (Comparative Example 2, b) had an average nanoparticle size of 2.00±0.21 nm, 1.86±0.31 nm and 1.96±0.29 nm, respectively. Formation of small aggregates of nanoparticles or crystal growth was observed after the heat treating. FIG. 2(d) is an enlarged image of the PtAu—CO nanoparticle catalyst.

Figure 3:
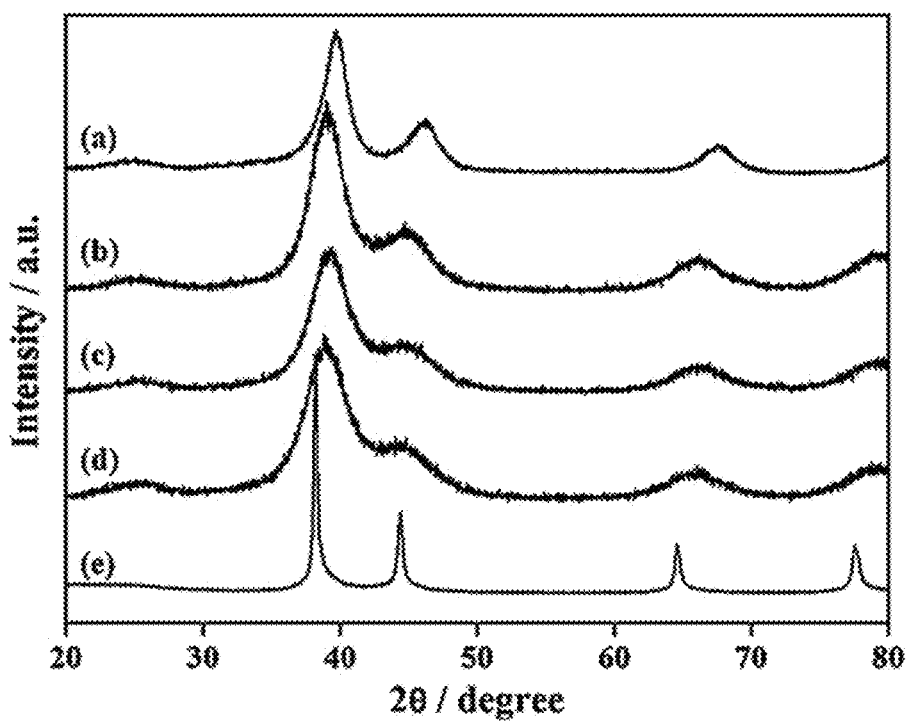
FIG. 3 shows the XRD patterns of a Pt catalyst (a), a PtAu—CO nanoparticle catalyst (b), a PtAu—Ar nanoparticle catalyst (c), a PtAu-AP nanoparticle catalyst (d) and an Au catalyst (e)

FIG. 3 shows the XRD patterns of the nanoparticle catalysts prepared in Example 1, Comparative Example 1 and Comparative Example 2.

The average nanoparticle size of the PtAu—CO nanoparticle catalyst (b), the PtAu—Ar nanoparticle catalyst (c) and the PtAu-AP nanoparticle catalyst (d) determined from peak linewidth enhancement is 2.4 nm, 2.2 nm and 2.2 nm, respectively, similarly to the TEM analysis result shown in FIG. 2.

The XRD peaks of the nanoparticle catalysts prepared in Example 1, Comparative Example 1 and Comparative Example 2 were found to correspond to the normal fcc structure and it is thought that the crystal structure of the catalyst formed from surface segregation by the heat treating under gas atmosphere originated from several layers on the surface.

The lattice constants of the nanoparticle catalysts prepared in Example 1, Comparative Example 1 and Comparative Example 2 (PtAu—CO nanoparticle catalyst: 4.00 Å, PtAu-AP nanoparticle catalyst: 3.99 Å, PtAu—Ar nanoparticle catalyst: 4.01 Å) are very similar to that of a PtAu alloy (4.00 Å) calculated from the Vegard's law using the lattice constants of Au (4.10 Å) and Pt (3.91 Å).

Figure 4:
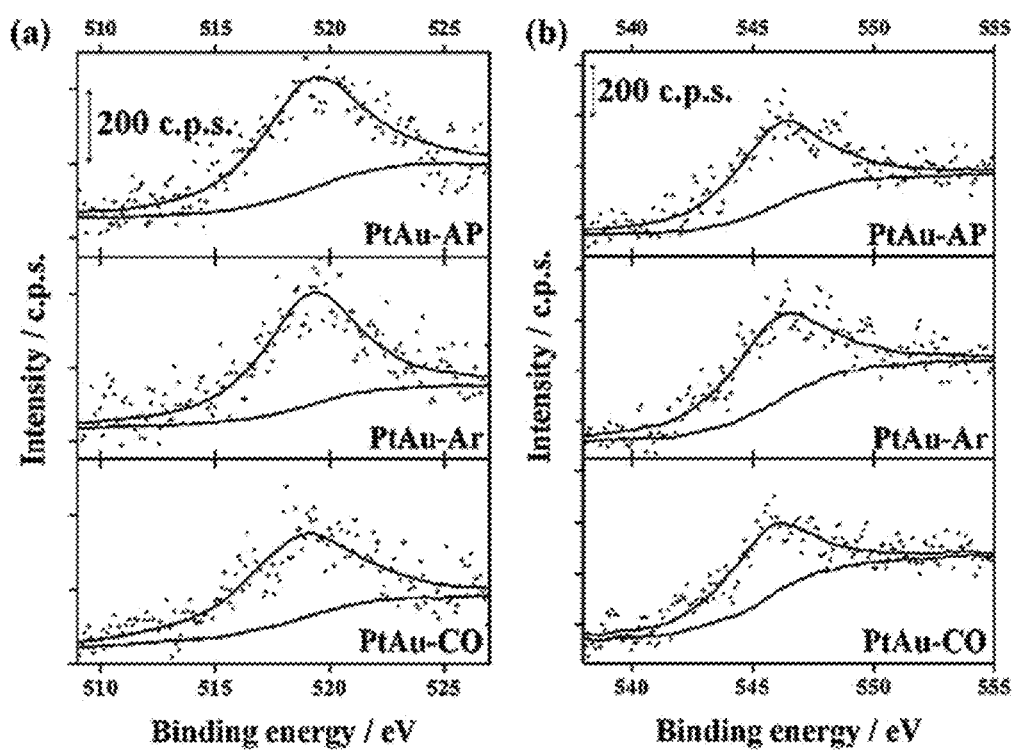
FIG. 4 shows the XPS spectra of nanoparticle catalysts prepared in an example and comparative examples at Pt $4p_{3/2}$ (a) and Au $4p_{3/2}$ (b)

FIG. 4 shows the X-ray photoelectron spectroscopy (XPS) spectra of the nanoparticle catalysts prepared in Example 1, Comparative Example 1 and Comparative Example 2 at Pt $4p_{3/2}$ (a) and Au $4p_{3/2}$ (b).

From the ratio of the Pt $4p_{3/2}$ peak area and the Au $4p_{3/2}$ peak area, it can be seen that the surface Pt concentration of the catalyst heat-treated under CO atmosphere (PtAu—CO) was increased as compared to the non-heat-treated catalyst (PtAu-AP), whereas the surface Pt concentration of the catalyst heat-treated under Ar atmosphere (PtAu—Ar) was decreased.

Figure 5:
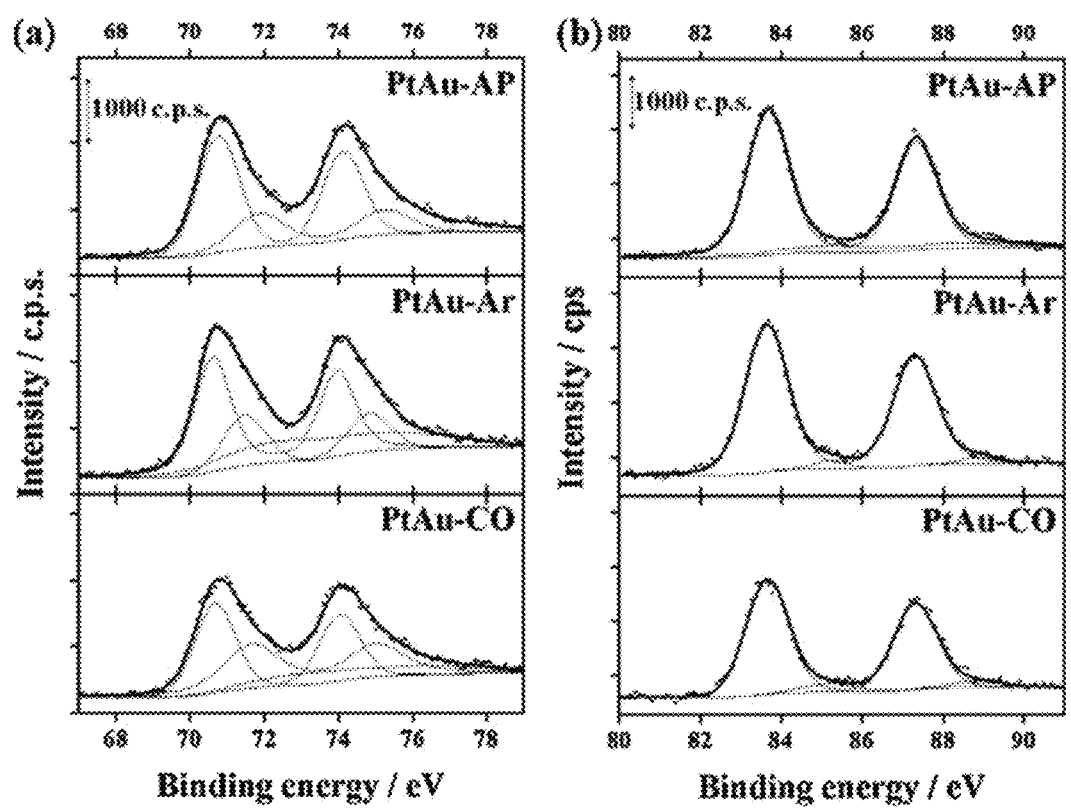
FIG. 5 shows the XPS spectra of nanoparticle catalysts prepared in an example and comparative examples at Pt 4f (a) and Au 4f (b)

FIG. 5 shows the XPS spectra of the nanoparticle catalysts prepared in Example 1, Comparative Example 1 and Comparative Example 2 at Pt 4f (a) and Au 4f (b).

It was found out that the Pt 4f binding energy (70.7 eV) of the nanoparticle catalysts prepared in Example 1, Comparative Example 1 and Comparative Example 2 was decreased as compared to the Pt catalyst (71.4 eV) and that the nanoparticle catalysts prepared in Example 1, Comparative Example 1 and Comparative Example 2 showed lower Au 4f binding energy (83.6 eV) as compared to the Au catalyst (84.2 eV).

The observed binding energies demonstrate that the PtAu nanoparticle catalyst includes alloy nanoparticles.

Figure 6:
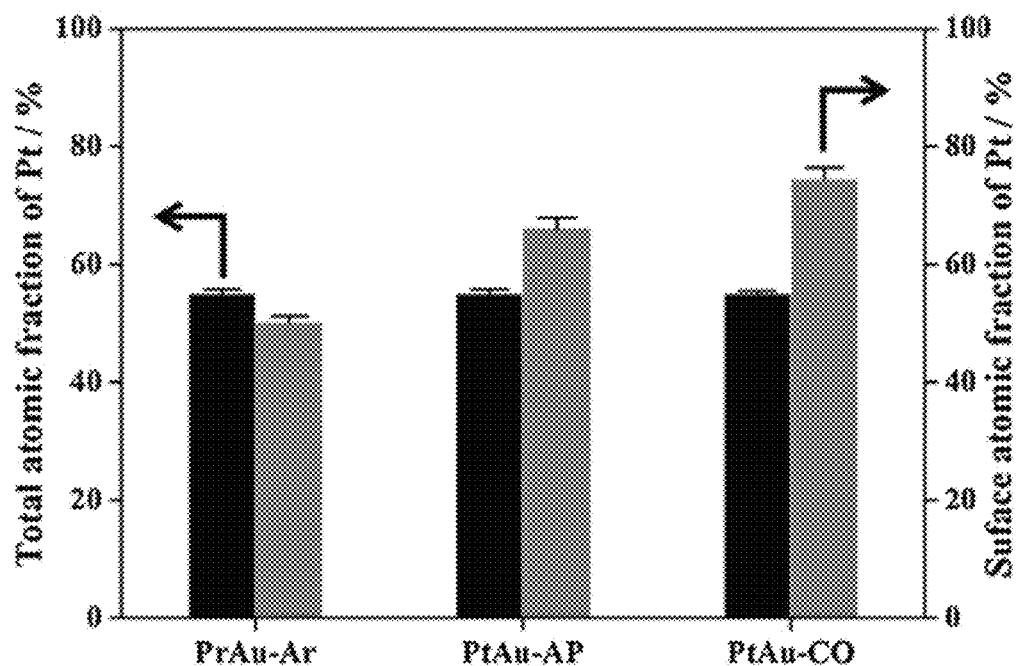
FIG. 6 shows the total atomic fraction of Pt and the surface atomic fraction of Pt determined from the XPS intensities at 4f and $4p_{3/2}$.

FIG. 6 shows the total atomic fraction of Pt (black, left) and the surface atomic fraction of Pt (red, right) determined from the XPS intensities at 4f and $4p_{3/2}$.

The total atomic fraction of Pt (number of Pt atoms/number of Pt and Au atoms in PtAu nanoparticles) was 55.1±0.5% for PtAu-AP, 55.2±0.3% for PtAu—CO and 55.2±0.5% for PtAu—Ar.

The higher Pt total atomic fraction of the PtAu-AP nanoparticle catalyst than the Pt total atomic fraction of the precursor solution is because of the high Pt atomic fraction near the surface.

The surface atomic fraction of Pt of the PtAu nanoparticle was measured from the XPS intensities at Pt $4p_{3/2}$ and Au $4p_{3/2}$ along with correction for photoelectron cross section. The mean free path of photoelectron Pt $4p_{3/2}$ and Au $4p_{3/2}$ is about 14 Å.

The surface atomic fraction of Pt of the PtAu—CO nanoparticle catalyst (Example 1) measured from the XPS intensities at Pt $4p_{3/2}$ and Au $4p_{3/2}$ was 74±2%, which corresponds to 1.12 times of 66±2% of the PtAu-AP nanoparticle catalyst (Comparative Example 1). Meanwhile, the surface atomic fraction of Pt of the PtAu—Ar nanoparticle catalyst (Comparative Example 2) was 50±1%. That is to say, the PtAu—CO, PtAu-AP and PtAu—Ar nanoparticle catalysts showed similar Pt total atomic fraction, but the surface atomic fraction of Pt of the PtAu—CO nanoparticle catalyst heat-treated under CO atmosphere was remarkably higher than those of other nanoparticle catalysts.

The surface atomic fraction of Pt is also electrochemically characterized by comparing the electrochemical surface area (ECA) of Pt and Au predicted from hydrogen desorption on the Pt surface ($Q_{H,Pt}$) and the reduction charge of oxide on the Au surface ($Q_{OH,Au}$). The electrochemical surface area of Au ($ECA_{Au}$) is determined from cyclic voltammetric (CV) analysis of the catalyst between 0.05 and 1.50 V. It is because Au exhibits a charge density of 400 μC/cm² and a characteristic peak decrease at ca. 1.3 V.

The electrochemical surface area of Au ($ECA_{Au}$) of the PtAu—CO nanoparticle catalyst (14.3 m²/$g_{Au}$) was decreased by 18.3% as compared to the PtAu-AP nanoparticle catalyst (17.5 m²/$g_{Au}$), whereas it was increased by 58.9% (27.8 m²/$g_{Au}$) in the PtAu—Ar nanoparticle catalyst.

Since CV measurement above 1.3 V may lead to irreversible oxidation of Pt, $Q_{H,Pt}$ was determined from CV measurement at 1.00 V.

The electrochemical surface area of Pt ($ECA_{Pt}$) of the PtAu-AP nanoparticle catalyst, the PtAu—CO nanoparticle catalyst and the PtAu—Ar nanoparticle catalyst was found to be 33.0 m²/$g_{Au}$, 38.2 m²/$g_{Au}$ and 31.5 m²/$g_{Au}$, respectively, from the hydrogen desorption charge density of polycrystalline Pt (210 μC/cm²). The PtAu—CO nanoparticle catalyst showed the largest electrochemical surface area of Pt ($ECA_{Pt}$).

Figure 7:
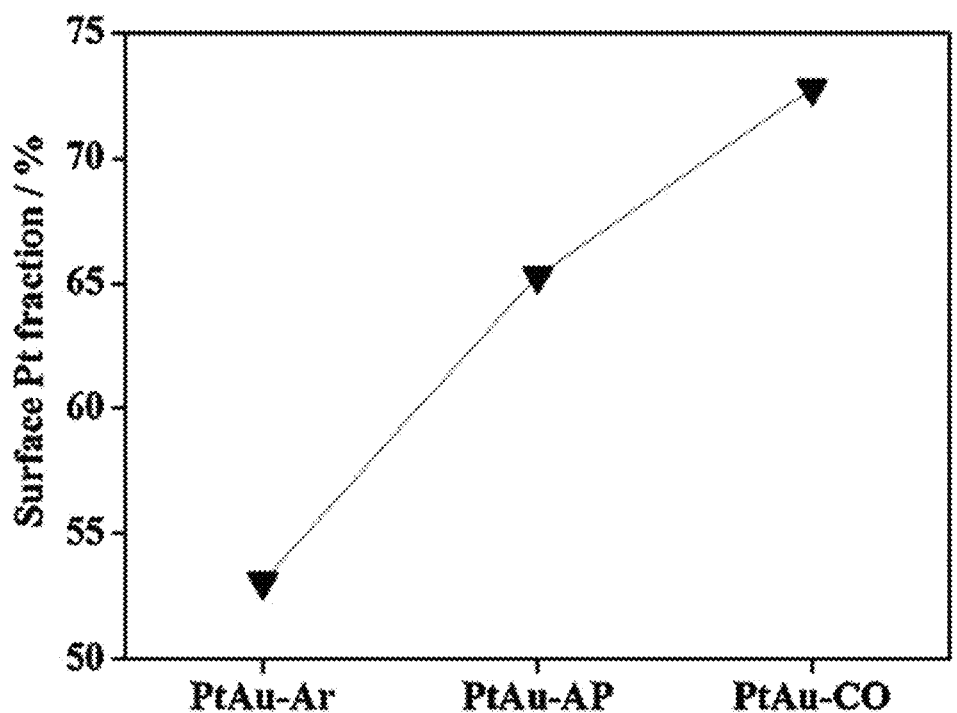
FIG. 7 shows the surface atomic fraction of Pt of nanoparticle catalysts prepared in an example and comparative examples.

The surface Pt fraction of the PtAu-AP nanoparticle catalyst was determined as 65.3% from the $ECA_{Pt}$ and the $ECA_{Au}$ and the surface Pt fraction of the PtAu—CO nanoparticle catalyst was found to be 72.8%, 1.11 times higher as compared to PtAu-AP. Meanwhile, the surface Pt fraction of the PtAu—Ar nanoparticle catalyst was lower than PtAu-AP as 53.1% (FIG. 7).

The ECA measurement result agrees with the XPS analysis result indicating higher surface Pt concentration (higher Pt surface area of the catalyst surface) of the PtAu nanoparticle catalyst.

Figure 8:
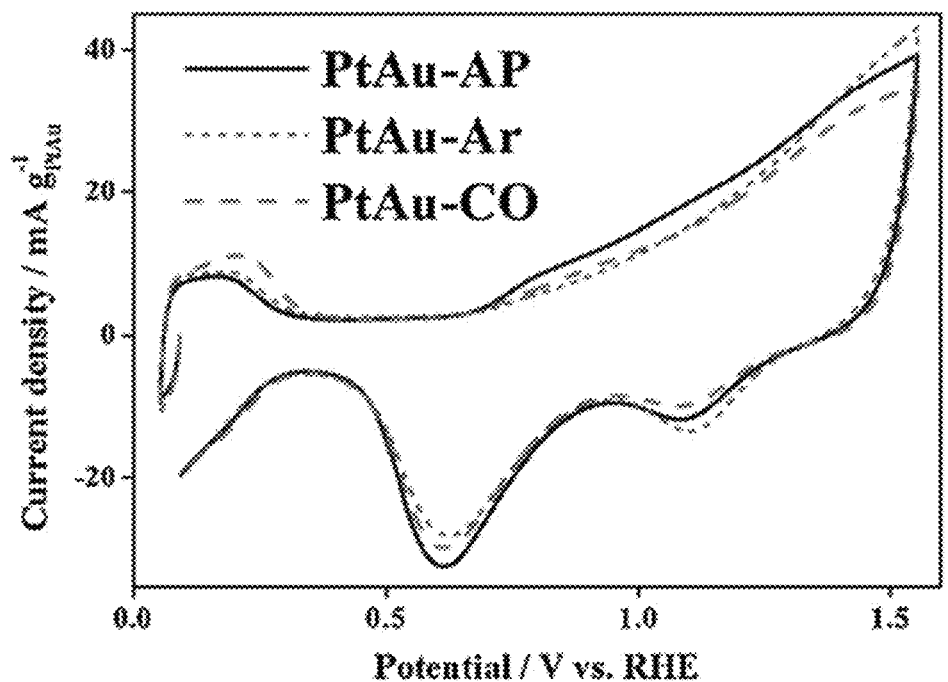
FIG. 8 shows the cyclic voltammograms (CVs) of nanoparticle catalysts prepared in an example and comparative examples.

FIG. 8 shows the cyclic voltammograms (CVs) of the PtAu nanoparticle catalysts (potential range: 54-1554 mV).

Pt surface area and Au surface area could be calculated from the positive peak at 54-400 mV and the negative peak at 1300-900 mV. From the ratio of the two peak areas, it was found out that the PtAu—CO nanoparticle catalyst has higher surface Pt concentration than the PtAu-AP nanoparticle catalyst and the PtAu—Ar nanoparticle catalyst has lower surface Pt concentration.

Figure 9:
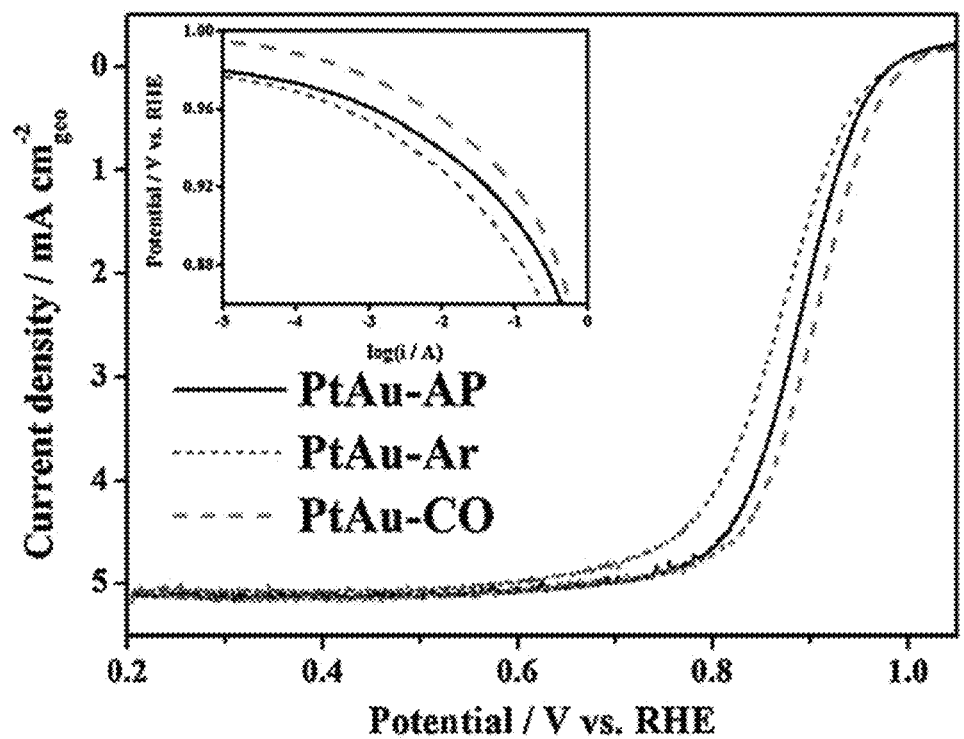
FIG. 9 shows the ORR polarization curves of nanoparticle catalysts prepared in an example and comparative examples.

FIG. 9 shows ORR polarization curves of the PtAu nanoparticle catalysts and the ORR Tafel plots as inserts.

The half-wave potential ($E_{1/2}$) was higher for the PtAu—CO nanoparticle catalyst (903 mV) than the PtAu-AP nanoparticle catalyst (887 mV), meaning that the overpotential for the oxygen reduction reaction of the PtAu—CO catalyst is lower as compared to the PtAu-AP nanoparticle catalyst. Accordingly, it can be seen that the increased Pt surface concentration due to the heat treating under CO atmosphere led to increased ORR activity.

From the increase of the electrochemical surface area of Pt ($ECA_{Pt}$) from 33.0 m²/$g_{Pt}$ (PtAu-AP nanoparticle catalyst) to 38.2 m²/$g_{Pt}$ (PtAu—CO nanoparticle catalyst), the shift of $E_{112}$ is presumed to be +4.0 mV according to the relationship between $ECA_{Pt}$ and $E_{1/2}$ presented by Adzic et al.

Figure 10:
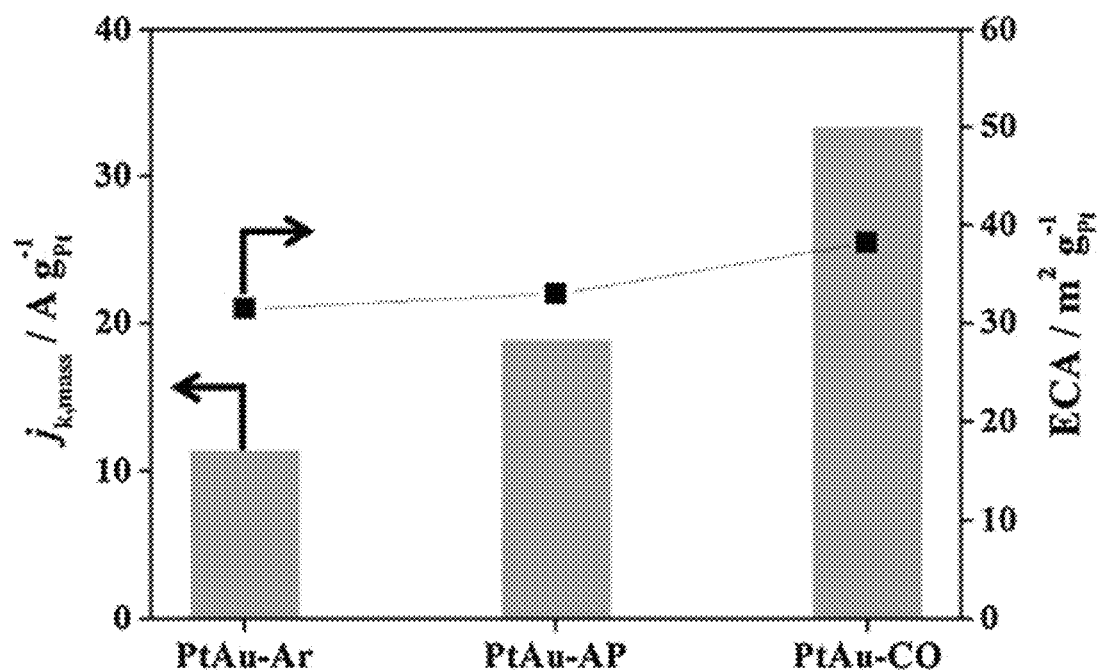
FIG. 10 shows the mass activity (bar graph) and the electrochemical surface area (line graph) of nanoparticle catalysts prepared in an example and comparative examples.

FIG. 10 shows the mass activity (bar graph) and the electrochemical surface area (line graph) of the PtAu nanoparticle catalysts.

From the polarization data, the mass activity was calculated as 18.9 A/$g_{Pt}$ (PtAu-AP nanoparticle catalyst), 33.2 A/$g_{Pt}$ (PtAu—CO nanoparticle catalyst) and 11.4 A/$g_{Pt}$ (PtAu—Ar nanoparticle catalyst) using the Koutecky-Levich equation:

$$1/i = 1/i_k + 1/i_{dl} \qquad \text{[Equation 1]}$$

wherein i is the measured current, $i_k$ is the measured kinetic current and $i_{dl}$ is the diffusion limiting current. The specific activity was determined by the $i_k$ divided by the $ECA_{Pt}$ value.

Figure 11:
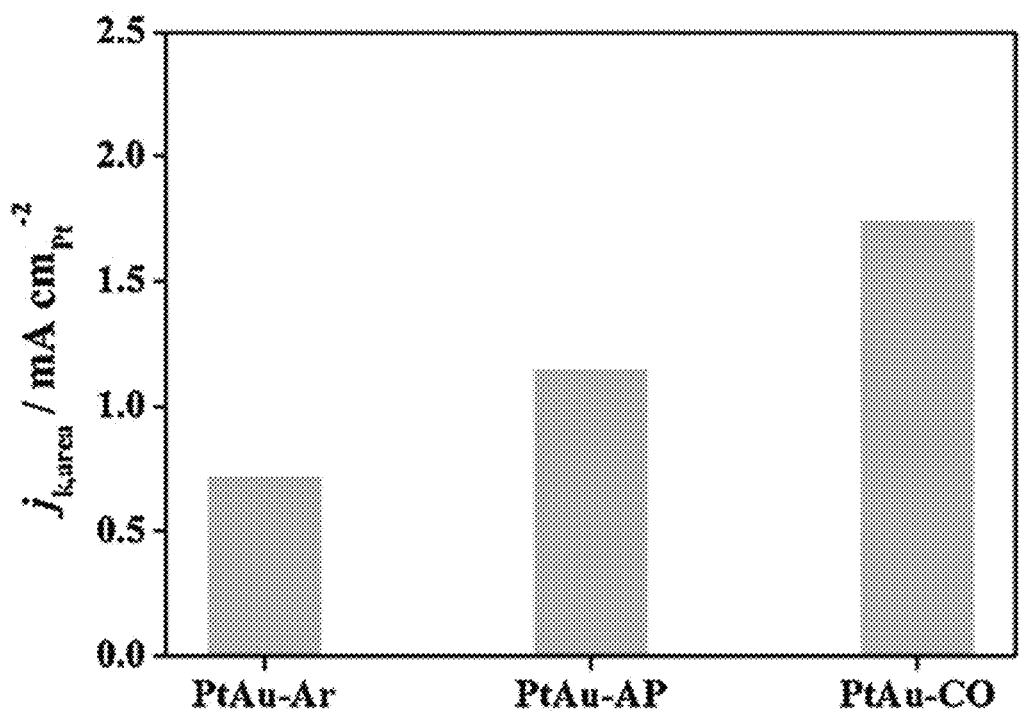
FIG. 11 shows the specific activity of nanoparticle catalysts prepared in an example and comparative examples.

FIG. 11 shows the specific activity ($i_k/ECA_{Pt}$ at 0.9 V) of the PtAu nanoparticle catalysts.

The specific activity of the PtAu—CO nanoparticle catalyst (1.74 mA/cmPt²) is 1.53 times higher than the PtAu-AP nanoparticle catalyst (1.14 mA/cmPt$^2$) as expected from the large shift of the polarization curve.

Since the ORR reaction of the PtAu—CO nanoparticle catalyst is restricted by OH desorption, it is though that the OH adsorption energy is decreased as a result of the surface modification by CO.

To demonstrate the change of the OH adsorption energy experimentally, the pztc value of each nanoparticle catalyst was determined by the CO displacement technique presented by Climent et al. The pztc measurement using the CO displacement technique is utilized to investigate the adsorption energy of ions.

The pztc value of Pt can be determined by finding out the potential at which the surface charge density of negative and positive ions is equal. The contribution of positive ions to the surface charge can be calculated from the CV measurement result because the deposited proton is the dominant positive ion species in the potential range of the CO displacement technique. And, the contribution of negative ions to the surface charge can be determined by subtracting the total surface charge accumulated during CO adsorption from the surface charge of positive ion, $Q_{H,Pt}$, above the CO adsorption potential (0.104 V).

The pztc value was lower in the PtAu-AP nanoparticle catalyst (209 mV) as compared to the PtAu—CO nanoparticle catalyst (221 mV). This clearly evidences that OH adsorption is decreased due to CO-induced surface segregation of Pt.

The heat treating under CO atmosphere increases the surface Pt fraction (from 65.3% to 72.8%), thereby reducing OH adsorption and enhancing ORR activity.

The improved ORR activity is a result of not only the decreased OH adsorption but also the concentration of Pt on the surface which leads to high Pt surface area.

Since the characteristics and structure of the PtAu—CO nanoparticle catalyst have been confirmed through computer simulation, the CO-induced surface segregation can also be applied to other Pt alloy surfaces to improve ORR activity. It is thought that the CO-induced surface segregation may be employed to improve the activity of the alloy nanoparticle catalyst supported on carbon without modification of the composition of the nanoparticle catalyst.

Example 2

Comparison with Pt$_3$Au Nanoparticle Catalysts Prepared in Comparative Example 3 and Comparative Example 4

Test Example 3

Figure 12:
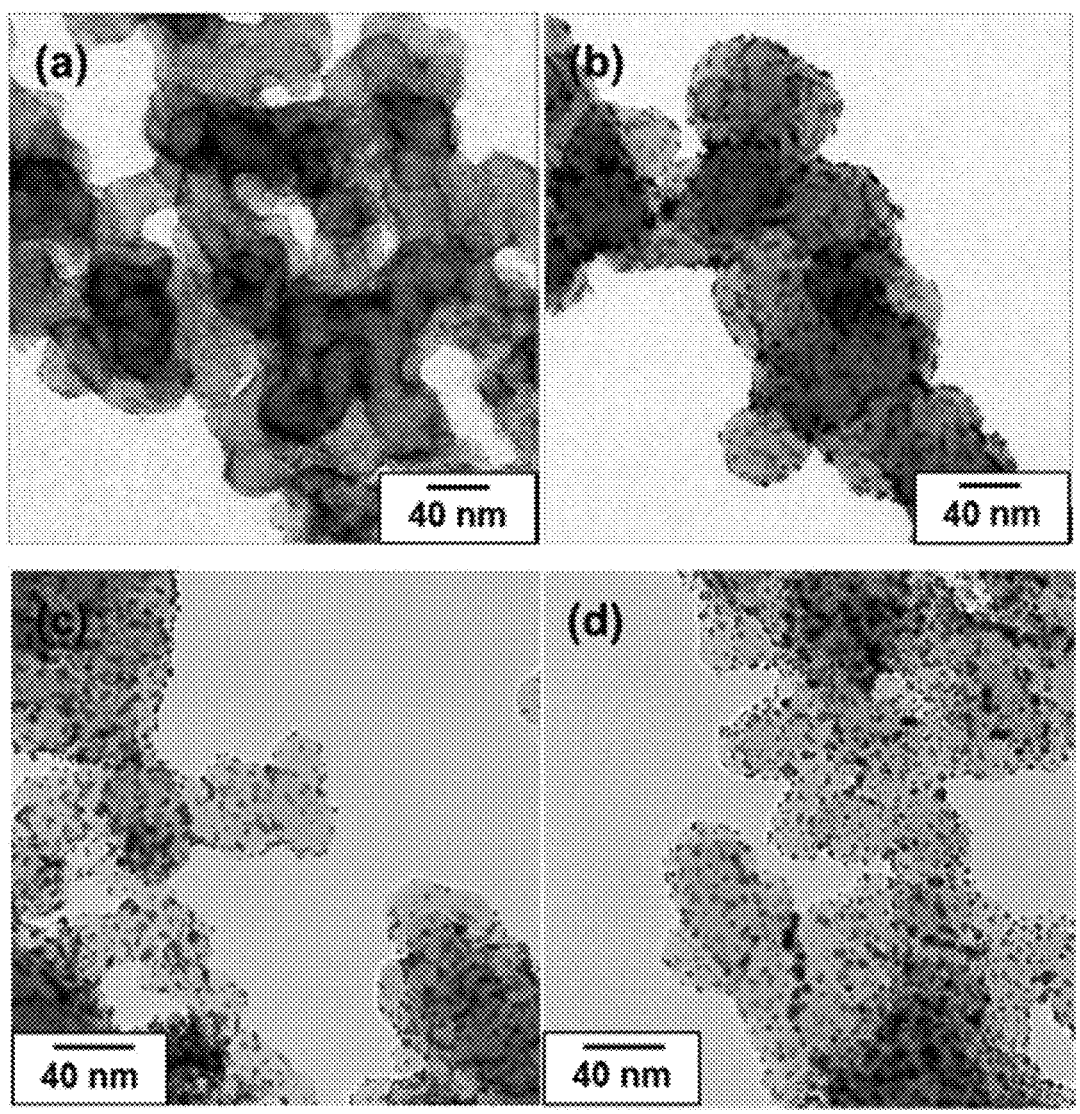
FIG. 12 shows the TEM images of nanoparticle catalysts prepared in another example and comparative examples.

Structural Characteristics of Pt$_3$Au-AP, Pt$_3$Au-A-CO, Pt$_3$Au-A and Pt$_3$Au-A-CO—Ar Nanoparticle Catalysts FIG. 12 shows the TEM images of the nanoparticle catalysts prepared in Example 2, Comparative Example 3 and Comparative Example 4.

The average nanoparticle size of the Pt$_3$Au-A-CO nanoparticle catalyst (Example 2, c) and the Pt$_3$Au-A-CO—Ar nanoparticle catalyst (Comparative Example 4, d) was 3.1 nm and 3.5 nm, respectively. When heat treating was performed under air atmosphere to remove the surfactant oleylamine present on the surface of the untreated Pt$_3$Au-AP nanoparticle catalyst (a), particle aggregates were observed and particle diameter could not be measured accurately because the particles were rod-shaped (Pt$_3$Au-A nanoparticle catalyst, Comparative Example 3, b).

Figure 13:
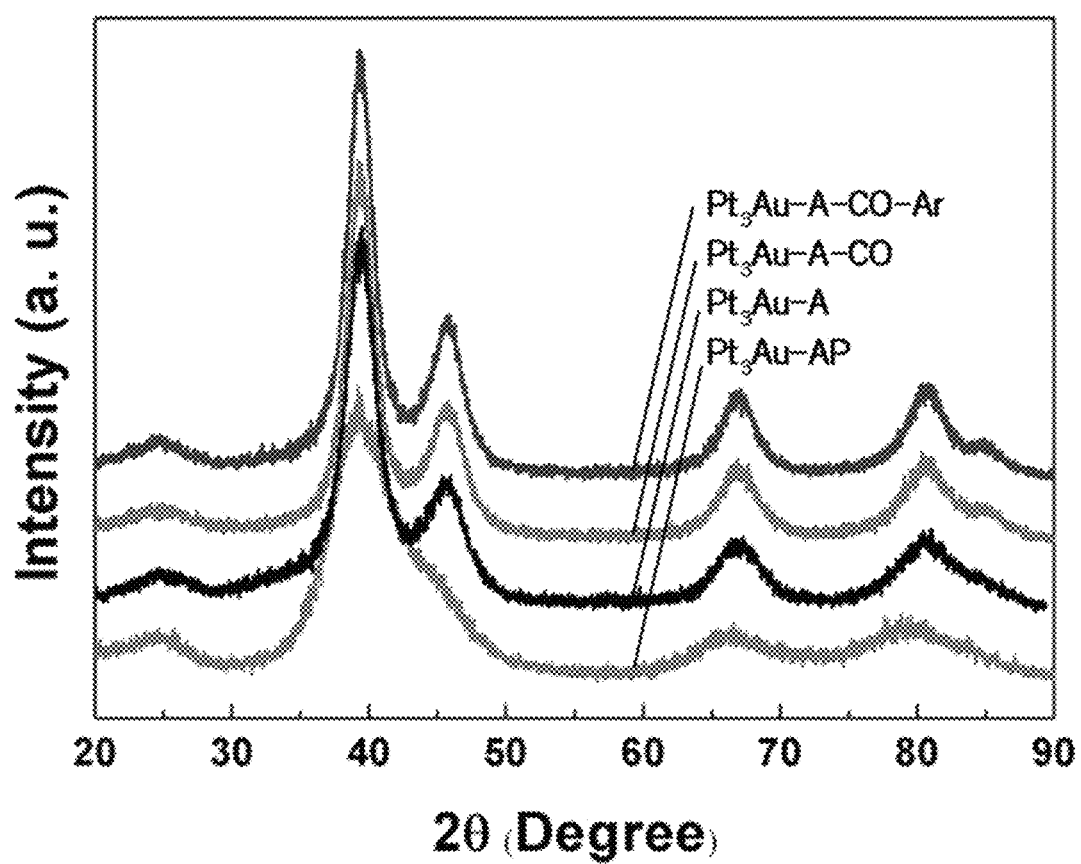
FIG. 13 shows the XRD patterns of nanoparticle catalysts prepared in another example and comparative examples.

FIG. 13 shows the XRD patterns of the nanoparticle catalysts prepared in Example 2, Comparative Example 3 and Comparative Example 4.

The crystallographic structure was similar for the Pt$_3$Au-A-CO (66.93°), Pt$_3$Au-A (66.92°) and Pt$_3$Au-A-CO—Ar (66.91°) nanoparticle catalysts, except for the untreated Pt$_3$Au-AP nanoparticle catalyst having the XRD peak at 66.00°.

The XRD peaks of the Pt$_3$Au nanoparticle catalysts observed at lower angles than that of pure Pt (67.46°) confirm the formation of PtAu alloy. From the Vegard's law, it is estimated that 75% of Au atoms were alloyed with Pt atoms.

Figure 14:
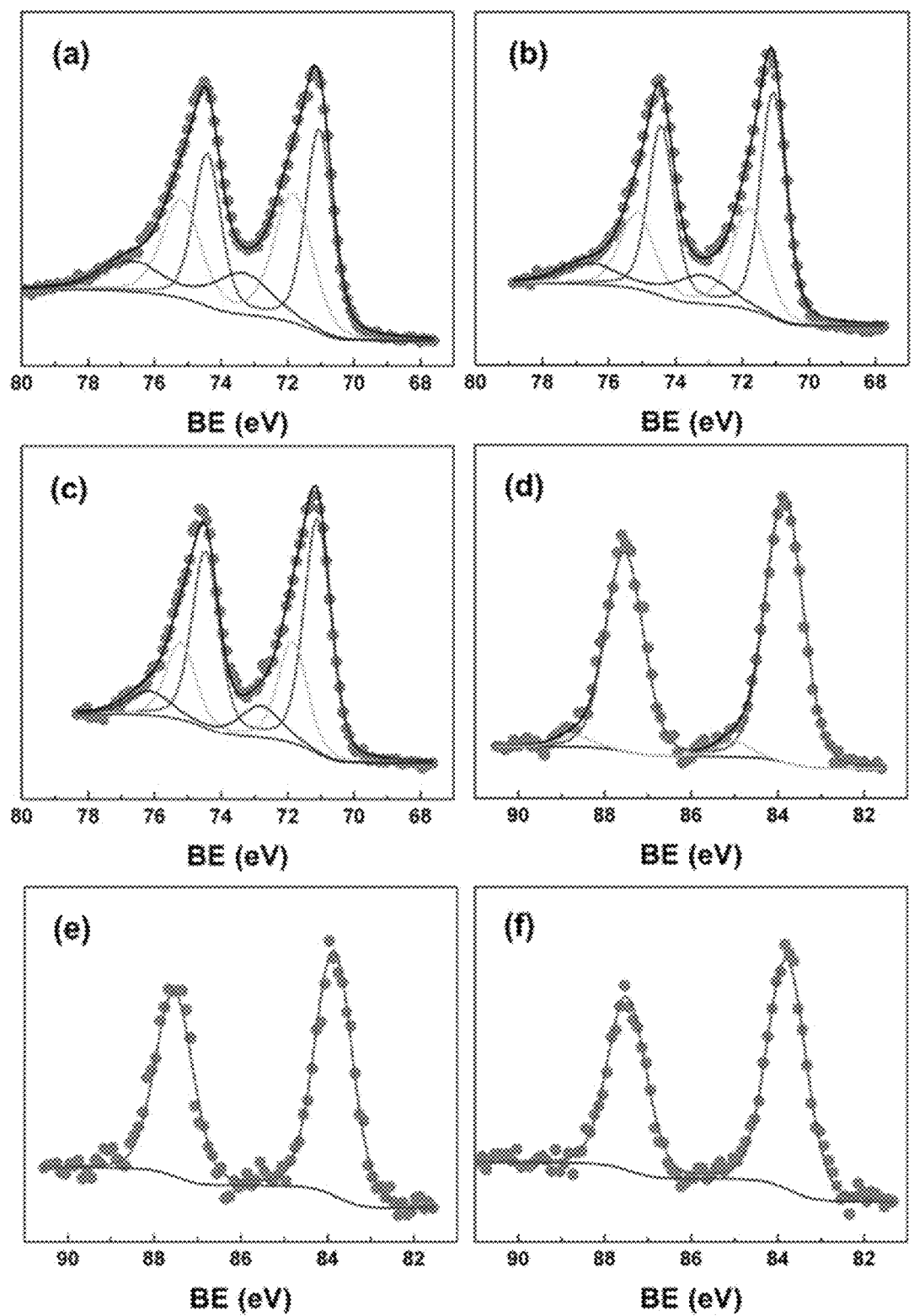
FIG. 14 shows the XPS spectra of nanoparticle catalysts prepared in another example and comparative examples.

FIG. 14 shows the XPS spectra of the nanoparticle catalysts prepared in Example 2, Comparative Example 3 and Comparative Example 4.

In FIG. 14, (a), (b) and (c) are respectively the deconvoluted Pt 4f spectra of the Pt$_3$Au-A, Pt$_3$Au-A-CO and Pt$_3$Au-A-CO—Ar nanoparticle catalysts, and (d), (e) and (f) are respectively the deconvoluted Au 4f spectra of the Pt$_3$Au-A, Pt$_3$Au-A-CO and Pt$_3$Au-A-CO—Ar nanoparticle catalysts.

The formation of Pt—Au alloy was confirmed by the downward shift (84.0 eV as compared to pure Au 4f$_{7/2}$) of the Au binding energy (BE) together with electron transfer from Pt atoms to Au atoms.

The ORR activity of the Pt$_x$Au$_y$-A-CO nanoparticle catalyst was 210-230 mA/mg$_{metal}$, whereas the ORR activity of the Pt/C catalyst was 50-60 mA/mg$_{metal}$.

Test Example 4

Electrochemical Characteristics of Pt/C, Pt$_3$Au-A-CO, Pt$_3$Au-A and Pt$_3$Au-A-CO—Ar Nanoparticle Catalysts FIG. 15(a) shows the CVs of the nanoparticle catalysts prepared in Example 2, Comparative Example 3 and Comparative Example 4, FIG. 15(b) shows the ORR performance of the nanoparticle catalysts prepared in Example 2, Comparative Example 3 and Comparative Example 4, FIG. 15(c) shows the mass activity of the nanoparticle catalysts prepared in Example 2, Comparative Example 3 and Comparative Example 4, and FIG. 15(d) shows the specific activity of the nanoparticle catalysts prepared in Example 2, Comparative Example 3 and Comparative Example 4.

The CVs were obtained in Ar-saturated 0.1 M HClO$_4$ at a scan rate of 20 mV/s and the ORR performance was tested in O$_2$-saturated 0.1 M HClO$_4$ at a scan rate of 5 mV/s. And, the specific activity was normalized to the hydrogen desorption surface area of Pt/C and the heat-treated Pt$_3$Au-A-CO, Pt$_3$Au-A and Pt$_3$Au-A-CO—Ar nanoparticle catalysts. The mass activity and the specific activity of the catalysts were measured 0.9 V using RDEs rotating at 1600 rpm. The ORR activity was calculated after iR correction.

During the heat treating, the total surface area of the nanoparticle decreased gradually as a result of particle growth. And, the electrochemical surface area of Pt (ECA$_{Pt}$) of the Pt$_3$Au-A-CO, Pt$_3$Au-A and Pt$_3$Au-A-CO—Ar nanoparticle catalysts was 30.9 m$^2$/g, 32.6 m$^2$/g and 26.2 m$^2$/g, respectively.

The Au content on the nanoparticle surface was calculated from the Au oxide reduction charge and the hydrogen desorption charge of Pt as 6%, 10% and 13% respectively for the Pt$_3$Au-A-CO, Pt$_3$Au-A and Pt$_3$Au-A-CO—Ar nanoparticle catalysts. Thus, it was found out that the Pt$_3$Au-A-

CO nanoparticle catalyst has less Au atoms on the surface as compared to other nanoparticle catalysts.

The ORR performance of the $Pt_3Au$-A-CO, $Pt_3Au$-A and $Pt_3Au$-A-CO—Ar nanoparticle catalysts was improved over the Pt/C catalyst ($ECA_{Pt}$: 51.6 m²/g). Among the nanoparticle catalysts, the $Pt_3Au$-A-CO nanoparticle catalyst exhibited the best performance (FIG. 15(b)).

After iR correction, the half-wave potential ($E_{1/2}$) of the $Pt_3Au$-A-CO, $Pt_3Au$-A, $Pt_3Au$-A-CO—Ar and $Pt_3Au$—Ar nanoparticle catalysts in the ORR polarization curves was 0.938 V, 0.922 V, 0.925 V and 0.906 V, respectively. The high half-wave potential of the $Pt_3Au$-A-CO nanoparticle catalyst means that the overpotential for oxygen reduction reaction of the $Pt_3Au$-A-CO nanoparticle catalyst is lower as compared to other nanoparticle catalysts. Accordingly, it can be seen that the CO-induced Pt surface concentration increase led to the increased ORR activity.

The mass activity of the $Pt_3Au$-A-CO, $Pt_3Au$-A and $Pt_3Au$-A-CO—Ar nanoparticle catalysts was increased 3-6 times (based on Pt) or 2-5 times (based on total metal) as compared to Pt/C (FIG. 15(c)).

Figure 15:
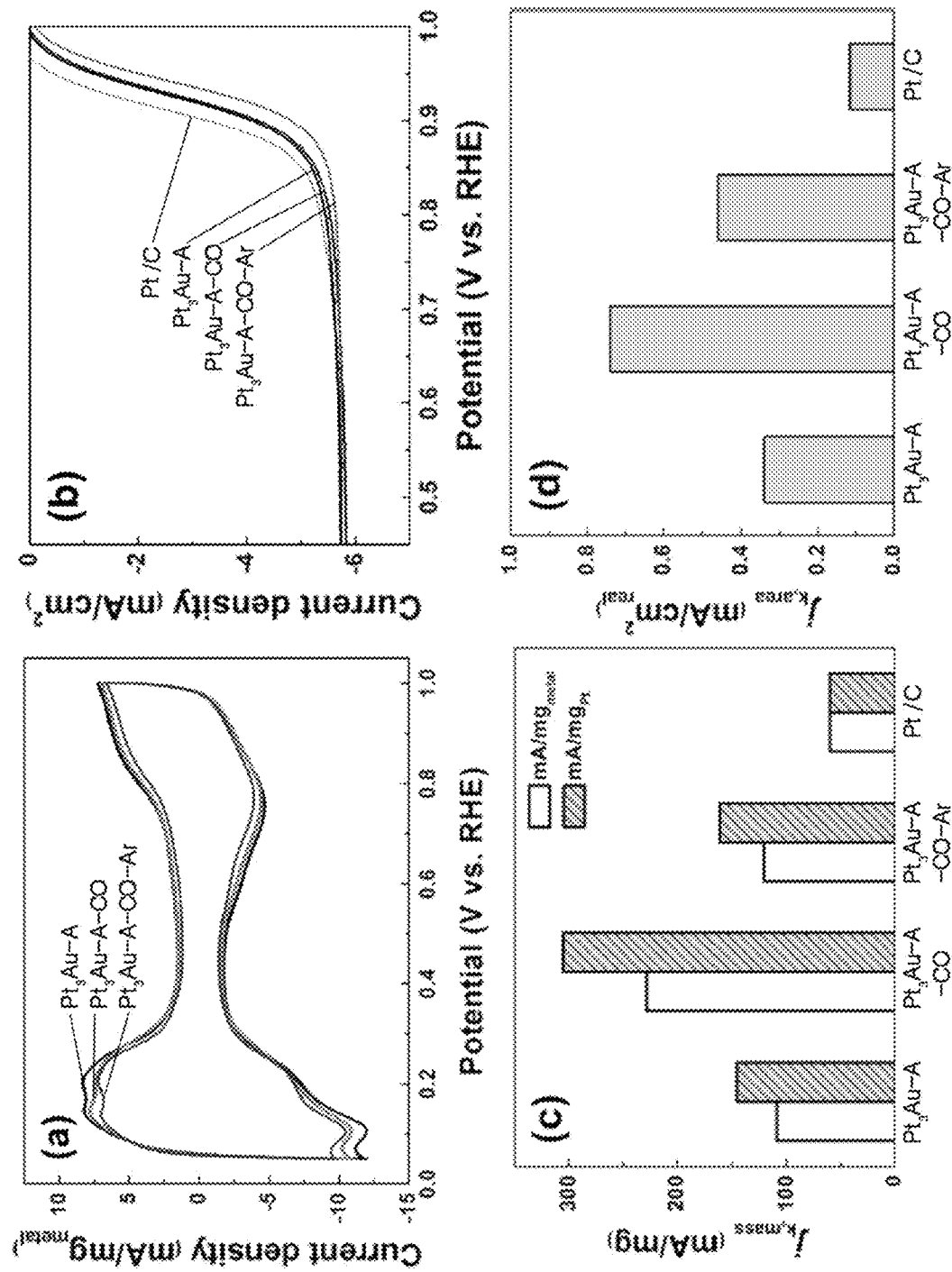
FIG. 15(a) shows the CVs of nanoparticle catalysts prepared in another example and comparative examples.
FIG. 15(b) shows the ORR performance of nanoparticle catalysts prepared in another example and comparative examples.
FIG. 15(c) shows the mass activity of nanoparticle catalysts prepared in another example and comparative examples.
FIG. 15(d) shows the specific activity of nanoparticle catalysts prepared in another example and comparative examples.

And, the specific activity of the $Pt_3Au$-A-CO, $Pt_3Au$-A and $Pt_3Au$-A-CO—Ar nanoparticle catalyst catalysts was increased 3-8 times as compared to Pt/C (FIG. 15 (d)).

The decreased activity of the catalyst heat-treated under Ar atmosphere is thought to be due to the change in the surface composition of the catalyst.

Figure 16:
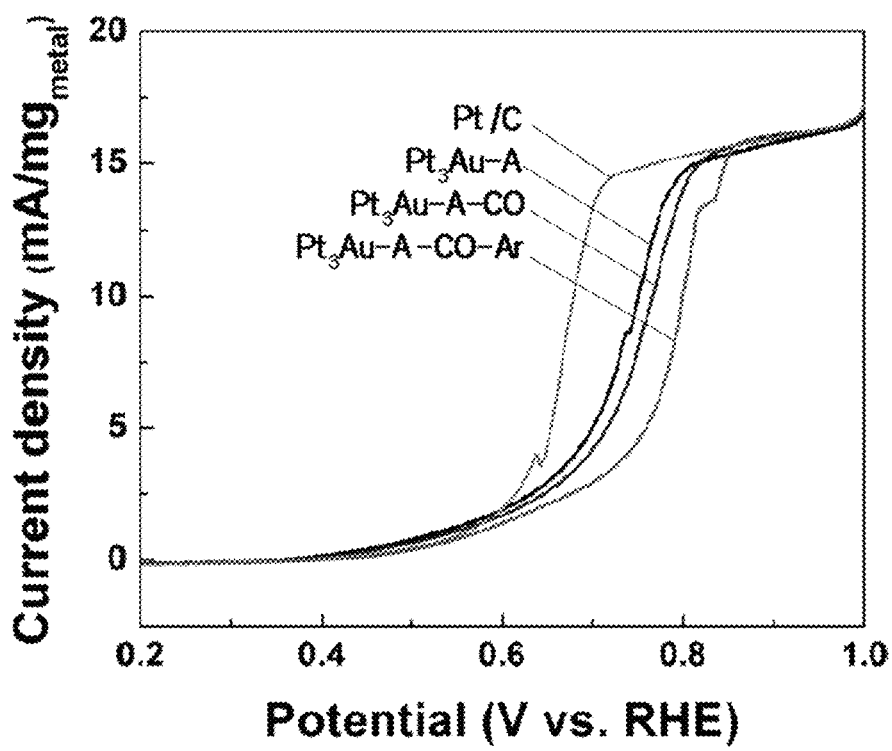
FIG. 16 shows the reverse sweep curves of nanoparticle catalysts prepared in another example and comparative examples for large-scale CO oxidation.

FIG. 16 shows the reverse sweep curves of the nanoparticle catalysts prepared in Example 2, Comparative Example 3 and Comparative Example 4 for bulk CO oxidation. The bulk CO oxidation was performed in CO-saturated 0.1 M $HClO_4$ at a scan rate of 1 mV/s and a rotation speed of 1600 rpm.

The surface structure of the nanoparticle catalysts was investigated to explain why the ORR activity was improved. The bulk CO oxidation was performed using RDEs according to the method previously reported by Markovic.

At high anode potential (e.g., 0.9 V), CO molecules may be oxidized quickly by binding with $OH_{ad}$ or oxides on the catalyst surface until the concentration-limited current is reached. When the potential was changed to a more negative value (i.e., during reverse sweep), the adsorption of $OH_{ad}$ and surface oxide gradually decreased and the measured current also decreased. Accordingly, oxophilicity could be confirmed from the potential shift of the current curve for the bulk CO oxidation.

Therefore, the $Pt_3Au$-A-CO nanoparticle catalyst was identified as the least oxophilic sample. Meanwhile, the Pt/C catalyst was identified as the most oxophilic sample from the bulk CO oxidation testing. This result matches well with the ORR activity.

Test Example 5

DFT Calculation of $Pt_3Au$-A-CO Nanoparticle Catalyst

DFT calculation was performed to understand the effect of CO-induced surface segregation and Pt—Au alloying on the oxophilicity of the $Pt_3Au$-A-CO nanoparticle catalyst surface.

For this, the OH binding energy ($BE_{OH}$, calculated energy) at the $Pt_3Au$-A-CO nanoparticle catalyst surface (surface segregation occurs as Pt atoms of the second surface layer are exchanged with the Au atoms of the surface layer) and at the bulk-terminated $Pt_3Au$ catalyst ($Pt_3Au$-AP) surface was calculated. For comparison, the $BE_{OH}$ of pure Pt was also calculated.

From the $BE_{OH}$ at the bulk-terminated $Pt_3Au$ catalyst (OH radicals are adsorbed on the sheet above the Pt atoms), the $BE_{OH}$ of the $Pt_3Au$ catalyst can be predicted. In particular, a large decrease in $BE_{OH}$ was expected when the surface composition (6-13% Au) was similar to that of the catalyst heat-treated under CO atmosphere. The ORR reaction rate can be improved by decreased surface OH adsorption (or increased availability of surface Pt), which is explained well by the decreased $BE_{OH}$ of the catalyst heat-treated under CO atmosphere. The decrease of $BE_{OH}$ of the catalyst heat-treated under CO atmosphere was about 0.1 eV with respect to Pt (111), which falls within the well-known optimum $BE_{OH}$ range for ORR.

Also, the decreased OH binding energy (or the least oxophilicity) of the CO-treated $Pt_3Au$-A-CO nanoparticle catalyst surface agrees with the experimental result of bulk CO oxidation. The decreased OH binding energy of the $Pt_3Au$-A-CO nanoparticle catalyst surface may be related with the ligand effect. The d-band theory has been used to successfully predict the ORR activity of catalyst systems. However, the d-band theory was not used to explain the improved ORR performance of the PtAu catalyst since the addition of Au or the formation of Pt above Au may lead to shift of the Pt d-band center and strain deformation of Pt lattices as a result of increased adsorption of reactants and intermediate species.

Instead of the lattice deformation effect (d-band theory), the ligand effect may cause decreased $BE_{OH}$. According to the ligand effect theory, Pt atoms adjacent to highly electronegative atoms such as Au experience decreased distance between Pt and adsorbed OH because of decreased electron density of the sp-orbital and, as a result, the OH binding energy may decrease due to increased repulsion between Pt and OH.

As described above, the $BE_{OH}$ for optimum ORR performance is known to be 0.1 eV lower than that of pure Pt. The DFT calculation result showed that the $BE_{OH}$ could be controlled to be 0.1 eV lower than that of pure Pt through fine-tuning of several top layers of the $Pt_3Au$-A-CO nanoparticle catalyst and the optimum surface state for ORR performance could be achieved.

From the DFT calculation, it was shown for the first time that the OH binding energy of the PtAu alloy catalyst is lower than that of pure Pt and that a superior oxygen reduction reaction activity can be achieved through the control of the OH binding energy through fine-tuning of the surface layers.

Test Example 6

Figure 17:
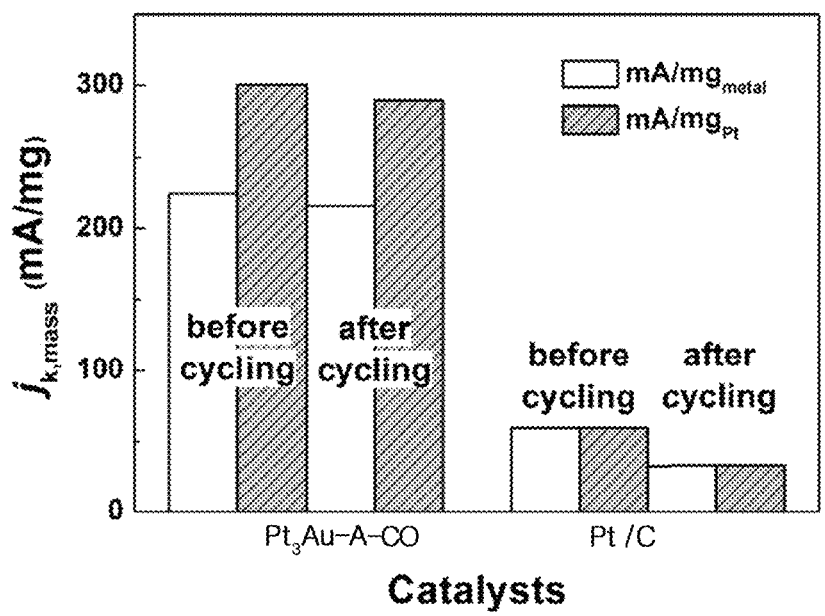
FIG. 17 shows the stability of a nanoparticle catalyst prepared in another example measured from potential cycling.

Measurement of Electrochemical Stability of $Pt_3Au$-A-CO and Pt/C Nanoparticle Catalysts FIG. 17 shows the stability of the nanoparticle catalyst prepared in Example 2 measured from potential cycling.

The stability of the $Pt_3Au$-A-CO and Pt/C nanoparticle catalysts was tested by potential cycling for 10,000 cycles in the potential range of 0.6-1.1 V.

After potential cycling, the ORR activity of the $Pt_3Au$-A-CO nanoparticle catalyst was decreased by 4.6% whereas the ORR activity of the Pt/C nanoparticle catalyst was decreased by 45.3%.

That is to say, the decrease of the ORR activity of the surface-modified $Pt_3Au$-A-CO nanoparticle catalyst was considerably smaller as compared to the Pt/C nanoparticle catalyst. The superior stability of the Pt₃Au-A-CO nanoparticle catalyst may result from the inhibited oxidation of the surface and the increased repulsion between Pt and OH resulting therefrom, which may decrease the release of Pt.

Measurement Apparatuses

TEM images were obtained at an acceleration voltage of 200 kV using the JEM-2010 microscope (JEOL, Ltd., Tokyo, Japan).

XRD patterns were obtained at 8-kW output using the D-MAX2500 diffractometer (Rigaku Corp., The Woodlands, Tex., USA).

XPS spectra were measured using Theta Probe (Thermo Electron Corp., Waltham, Mass., USA) at the Korea Basic Science Institute.

Electrochemical measurements were conducted in a standard 3-port electrochemical cell using a rotating disk electrode system (Eco Chemie BV). A catalyst-coated amorphous carbon (GC, 5 mm diameter) substrate, a GC rod and a saturated calomel electrode were used respectively as a working electrode, a counter electrode and a reference electrode. All the potential measurements were reported after correction for a specially built reversible hydrogen electrode (RHE). The reference electrode was separated from the working electrode by an electrolyte bridge to avoid chloride contamination. Air-removed 0.1 M HClO₄ was used for all the electrochemical measurements except for the ORR polarization curve measurement.

Cyclic voltammetric (CV) measurements were made at a scan rate of 20 mV s⁻¹. Before the CV measurement, potential cycling was performed in the range of 0-0.4V to obtain stable voltammograms. The cyclic voltammograms were reproducible with ~3% of hydrogen desorption charge density variation.

ORR performance was tested in O₂-saturated 0.1 M HClO₄ solution at a scan rate of 5 mV s⁻¹ and a rotating speed of 1600 rpm.

All the electrochemical measurements were made at a constant temperature of 20±0.5° C.

The potential of zero total charge (pztc) was calculated from the charge contribution by the hydrogen desorbed by CO. Briefly, CO was adsorbed onto the electrode at 0.104 V. Specifically adsorbed hydrogens are the dominant ion species and their desorption charge were recorded during CO adsorption. Since the pztc corresponds to the difference between the potential at which CO adsorption occurs and the charge of the cations desorbed by the CO adsorption, the pztc can be calculated from the hydrogen desorption charge obtained from the CV measurement.

Potential cycling was performed for 10,000 cycles in O₂-saturated 0.1 M HClO₄ solution at a scan rate of 50 mV/s in the potential range between 0.6 V and 1.1 V in order to test the stability of the PtAu nanoparticle catalyst.

DFT calculation was performed using the Vienna Ab-initio Simulation Package (VASP), using the spin-polarized DFT within the generalized gradient approximation (GGA-PW9). The projector augmented wave (PAW) method and a plane wave basis set were used to describe the interaction between the core and valence electrons, and an energy cutoff of 350 eV was applied for the plane wave expansion of electronic eigenfunctions. For Brillouin zone integration, a (2×2×1) Monkhorst-Pack mesh of k points was used to determine the optimal geometries and total energies.

Bulk CO oxidation was conducted in CO-saturated 0.1 M HClO₄ by CV (1 mV) with potential hold at 0.05 V vs. RHE (1600 rpm) for 10 minutes.

ORR performance was measured in O₂-saturated 0.1 M HClO₄ at a scan rate of 5 mV/s and a rotating speed of 1600 rpm. ORR activity was calculated by conducting linear sweep voltammetry in O₂-saturated 0.1 M HClO₄ (1600 rpm) at a scan rate of 5 mV/s in the range of 0.2-1.1 V followed by iR correction.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing a PtAu—CO nanoparticle catalyst, the method comprising:
    adding carbon black, a Pt salt, a Au salt, and a stabilizer into an anhydrous alcohol to form a dispersion mixture;
    adding a reducing agent to the dispersion mixture to prepare a PtAu nanoparticle catalyst;
    filtering the dispersion mixture with the added PtAu nanoparticle catalyst;
    drying the filtered PtAu nanoparticle catalyst;
    heat-treating the dried PtAu nanoparticle catalyst at 400-500 K under air atmosphere; and
    further heat-treating the heat-treated PtAu nanoparticle catalyst under carbon monoxide (CO) atmosphere to prepare the PtAu—CO nanoparticle catalyst, wherein the PtAu—CO nomenclature is used to indicate that the PtAu nanoparticle catalyst has undergone heat-treatment under the carbon monoxide (CO) atmosphere wherein the PtAu—CO nanoparticle catalyst has a mass activity of 200-500 mA/mg$_{Pt}$.

2. The method of claim 1, wherein the anhydrous alcohol is selected from the group consisting of anhydrous ethanol and anhydrous methanol.

3. The method of claim 1, wherein the reducing agent is selected from the group consisting of tert-butylamine borane, trimethylamine borane, formic acid, ammonium formate, and dimethylamine borane.

\* \* \* \* \*